United States Patent [19]

Coppa et al.

[11] 4,375,322
[45] Mar. 1, 1983

[54] FULL RANGE VARIABLE PROPORTIONAL FILL FLASH SYSTEM

[75] Inventors: Richard J. Coppa, Westwood; Marie T. Rodriguez, Somerville, both of Mass.

[73] Assignee: Polaroid Corporation, Cambridge, Mass.

[21] Appl. No.: 262,501

[22] Filed: May 11, 1981

[51] Int. Cl.³ ............................ G03B 7/14; G03B 3/00
[52] U.S. Cl. ........................................ 354/27; 354/33; 354/195
[58] Field of Search ................... 354/23 D, 27, 29, 33, 354/34, 60 F, 195

[56] References Cited

U.S. PATENT DOCUMENTS

| | | |
|---|---|---|
| Re. 29,599 | 3/1978 | Ogawa . |
| 3,478,660 | 11/1969 | Land . |
| 3,682,056 | 8/1972 | Tokutomi . |
| 3,710,701 | 1/1973 | Takishima et al. . |
| 3,742,828 | 7/1973 | Nakajima et al. . |
| 3,744,385 | 7/1973 | Burgarella et al. . |
| 3,791,278 | 2/1974 | Biber et al. . |
| 3,832,722 | 8/1974 | Douglas . |
| 3,836,920 | 9/1974 | Uchiyama et al. . |
| 3,928,859 | 12/1975 | Petersen . |
| 3,942,183 | 3/1976 | Whiteside . |
| 3,977,014 | 8/1976 | Norris . |
| 4,005,444 | 1/1977 | Uchiyama et al. . |
| 4,023,187 | 5/1977 | Shenk . |
| 4,024,549 | 5/1977 | Matsumoto . |
| 4,035,814 | 7/1977 | Nobusawa . |
| 4,040,072 | 8/1977 | Johnson et al. . |
| 4,065,776 | 12/1977 | Iwata et al. . |
| 4,167,316 | 9/1979 | Johnson et al. . |
| 4,188,103 | 2/1980 | Biber et al. . |
| 4,192,587 | 3/1980 | LaRocque et al. . |
| 4,199,246 | 4/1980 | Muggli . |
| 4,329,031 | 5/1982 | Carcia et al. ................. 354/33 |

*Primary Examiner*—Russell E. Adams
*Attorney, Agent, or Firm*—Edward S. Roman

[57] ABSTRACT

A photographic exposure control system of the type for controlling both the duration of a photographic exposure interval and the amount of artificial illumination provided during the exposure interval includes the capability of increasing the amount of artificial illumination in direct corresponding relation with increases in the camera-to-subject distance and the ambient scene light intensity in order to maintain the same proportional contribution to the film exposure from the ambient artificial light during a fill flash exposure.

20 Claims, 9 Drawing Figures

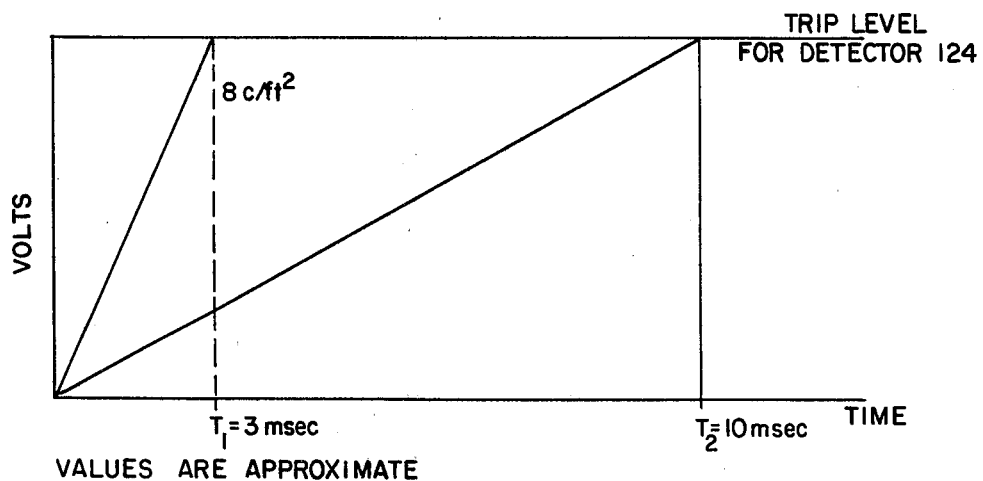
FIG. 5
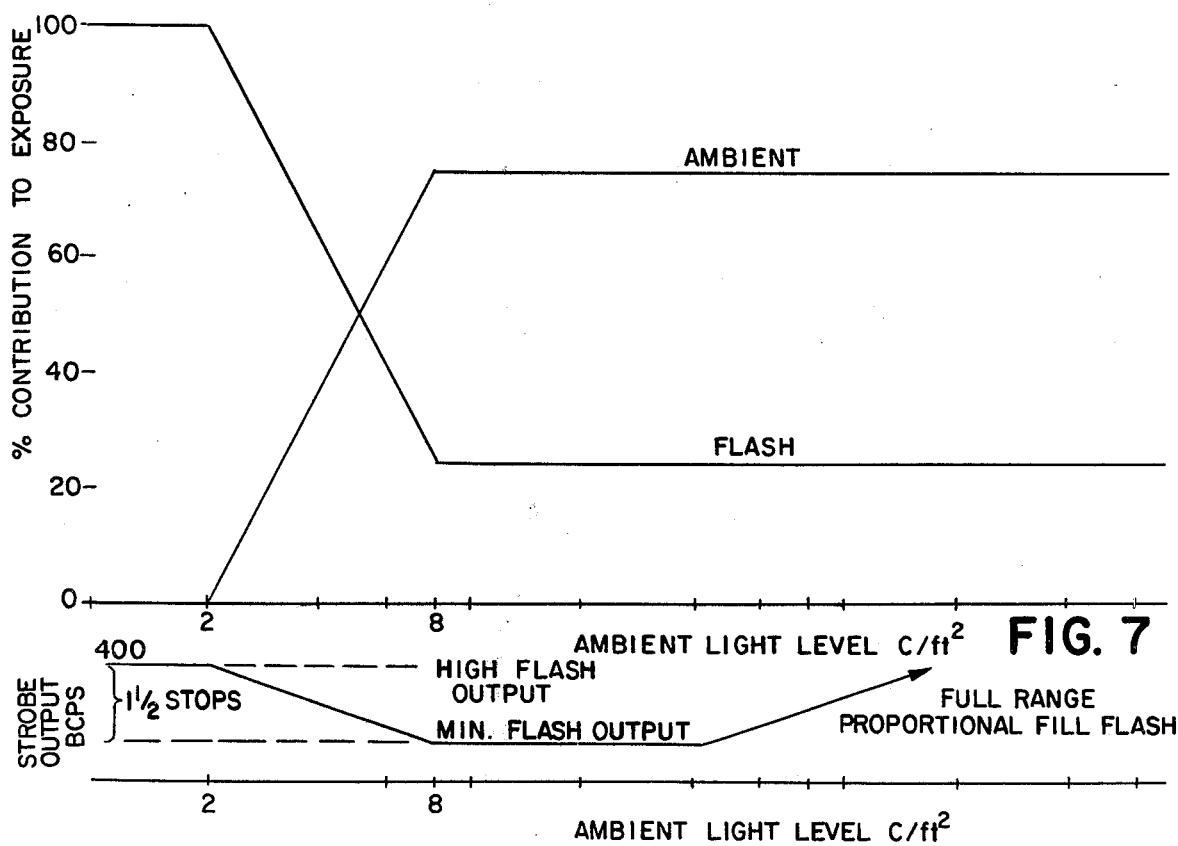
FIG. 7
FIG. 6

AMBIENT SCENE LIGHT INTENSITY

| | 12.5 | 25 | 50 | 100 | 200 | 400 | 800 | c/½/ft |
|---|---|---|---|---|---|---|---|---|
| 1'– | | | | | | | | |
| 3'– | | | | | | | 250 BCPS | 280 |
| 5'– | | | | | | 340 | 390 | 410 |
| 6'– | | | | | 290 | 390 | 440 | 450 |
| 8'– | | | | 180 | 420 | 480 | 510 | 520 |
| 10'– | | | 140 | 350 | 500 | 540 | 560 | 570 |
| 12'– | | 140 BCPS | 140 | 450 | 550 | 580 | 590 | 600 |
| 15'– | | | 140 | 230 | 550 | 600 | 610 | 620 | 630 |
| 18'– | | | 140 | 430 | 600 | 630 | 640 | 640 | 650 BCPS |

CAMERA TO SUBJECT RANGES

FIG. 8

FULL RANGE VARIABLE PROPORTIONAL FILL FLASH SYSTEM

BACKGROUND OF THE INVENTION

1. Field of the Invention

This invention relates generally to a flash fire control system for a photographic apparatus and, more particularly, to a flash fire control system for a photographic camera apparatus for providing a full range proportional fill flash over a broad range of camera-to-subject distances in ambient scene light intensity levels.

2. Description of the Prior Art

In the photographic art, exposure control systems embodying scanning shutter blade elements which operate to vary exposure areas with time during the exposure interval are well known as indicated by U.S. Pat. No. 3,942,183, entitled "Camera with Pivoting Blades", by G. Whiteside, issued Mar. 2, 1976, in common assignment herewith. Such scanning shutter blade mechanisms generally include a pair of counter-reciprocating shutter blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during the shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanism of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system in the camera in a manner as is more fully disclosed in U.S. Pat. No. 3,977,014, entitled "Follow Focus Exposure Control System with Improved Uniform Trim Control", by P. Norris, issued Aug. 24, 1976, in common assignment herewith.

Such a system need not actually stop the opening shutter blade movement at a maximum effective exposure aperture as determined by the rangefinding or focusing system of the camera but may, instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by E. Land, issued Nov. 18, 1979, in common assignment herewith. Range responsive flash fire systems of the aforementioned type can also be utilized in conjunction with sonar rangefinding devices as more fully described in U.S. Pat. No. 4,188,103, entitled "Range Synchronized Flash Photographic Apparatus and Method for Achieving Optimum Exposure", issued Feb. 12, 1981, in common assignment herewith.

Exposure and artificial illumination control systems of the aforementioned type are generally intended to provide a source of artificial illumination only during the low ambient scene light intensity mode of operation. However, there may also be conditions during high ambient scene light intensity modes of operation where it becomes desirable to provide artificial illumination to fill in the photographic subject against a brightly backlit scene as is more fully disclosed in U.S. Pat. No. 4,023,187, entitled "Exposure Control System with Fill Flash Race Condition", by E. Shenk, issued May 10, 1977, in common assignment herewith. The aforementioned artificial illumination control system operates under conditions of low ambient scene light intensity to fire the strobe at a predetermined time period subsequent to the initiation of the exposure interval and under conditions of high ambient scene light intensity to fire the strobe light as a consequence of the time integration of the scene light intensity incident to the photoresponsive element reaching a predetermined value. This fill flash system, however, fails to provide a select ratio between that portion of the exposure which is directly attributable to the artificial scene illumination and the remaining portion of the exposure which is directly attributable to ambient scene light illumination over a determinate range of camera-to-subject distances.

More recently, a photographic exposure and flash fire control system as disclosed in U.S. Pat. No. 4,192,587, entitled "Proportional Fill Flash", by A. LaRocque, issued Mar. 11, 1980, in common assignment herewith, is provided for firing of a strobe in a fill flash mode of operation in a manner whereby a select ratio may be maintained between that proportion of the exposure which is directly attributable to the artificial scene illumination and the remaining proportion of the exposure which is directly attributable to the ambient scene light illumination. Such a select proportional fill flash is accomplished by providing means whereby the light integration control circuit discounts the artificial illumination provided by the strobe. Toward this end, the system includes a sample and hold circuit which operates to sample the output voltage from a photoresponsive element and to transfer the sampled output voltage directly to a light integrating circuit. However, upon the firing of the strobe, the sample and hold circuit operates to hold the sampled voltage immediately prior to the firing of the strobe to apply the sampled voltage to the light integrating circuit for the duration of the strobe pulse.

For exposure control systems of the aforementioned type, it is often preferable to provide a substantially greater amount of artificial illumination during the ordinary flash mode of operation wherein the exposure influencing effect of the ambient scene light is negligible as opposed to the fill in flash situation where the ambient scene light contribution to the exposure is most significant. Toward this end, there may be provided a pre-exposure ambient scene light measurement, the results of which are utilized to subsequently control the amount of artificial illumination provided by the electronic flash or strobe during the exposure interval. Although ordinarily less artificial light might be provided during the fill in flash mode of operation, under certain circumstances such as increased ambient scene light intensity levels and greater camera-to-subject distances, it may become necessary to increase the amount of artificial illumination provided to maintain the same percentage contribution to exposure between the ambient scene light and the artificial scene light.

Therefore, it is a primary object of this invention to provide a flash fire control system wherein the output of the flash may be varied to maintain the same contribution to exposure between ambient and artificial scene light under conditions of increasing camera-to-subject distances and increasing levels of ambient scene light intensity.

It is a further object of this invention to provide a full range proportional fill flash control system for progressively increasing the amount of artificial illumination provided during the exposure interval in corresponding relationship with increasing levels of ambient scene light intensity and increasing camera-to-subject distances in order to maintain the same contribution to exposure between artificial and ambient scene light.

Other objects of the invention will be in part obvious and will in part appear hereinafter. The invention accordingly comprises a mechanism and system possessing a construction, combination of elements and arrangement of parts, which are exemplified in the following detailed disclosure.

SUMMARY OF THE INVENTION

A photographic exposure control system of the type for controlling both the duration of a photographic exposure interval and the amount of artificial illumination provided during the exposure interval includes a control circuit for further controlling the amount of artificial illumination provided during the exposure interval in a manner whereby the amount of artificial illumination provided during the exposure interval is increased in direct corresponding relation with increases in camera-to-subject distance and the amount of scene light intensity in order to maintain the same proportional contribution to the film exposure from the ambient and artificial light during a fill flash type of exposure. The photographic camera apparatus is of the type which includes means responsive to the determination of the camera-to-subject distance for providing an output response corresponding to the determined camera-to-subject distance. The photographic camera apparatus further includes means for detecting the ambient scene light intensity at least prior to the exposure interval and for providing an output signal in response to the ambient scene light so detected. The amount of artificial illumination provided during the exposure interval is thereafter controlled as a function solely of the output signal from the ambient scene light detecting means prior to the exposure interval when the output signal from the ambient scene light detecting means prior to the exposure interval is less than a select value. Alternatively, the amount of artificial illumination is controlled as a function of both the output response which corresponds to the determined camera-to-subject distance and the output signal from the ambient scene light detecting means prior to the exposure interval when the output signal from the ambient scene light detecting means prior to the exposure interval is greater than the aforementioned select value. Thus, the artificial illumination control means operates to increase the amount of artificial illumination provided during the exposure interval in correspondence with decreasing ambient scene light intensity when the ambient scene light intensity detected prior to exposure is less than the select value and to increase the amount of artificial illumination provided during the exposure interval in correspondence with increasing ambient scene light intensity and increasing camera-to-subject distance when the ambient scene light intensity detected prior to exposure is greater than the select value.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 5 is a graphical representation showing the pre-exposure ambient scene light integration under various conditions of ambient scene light intensity;

FIG. 6 is a graphical representation showing the variation in the flash output versus the variation in the ambient scene light intensity;

FIG. 7 is a graphical representation showing the variation in the contribution to the film exposure between the ambient scene light and the artificial scene light versus the variation in the ambient scene light intensity;

FIG. 8 is a graphical representation showing the variation in the fill flash output versus ambient scene light intensity and subject range.

DESCRIPTION OF THE PREFERRED EMBODIMENTS

Figure 1:
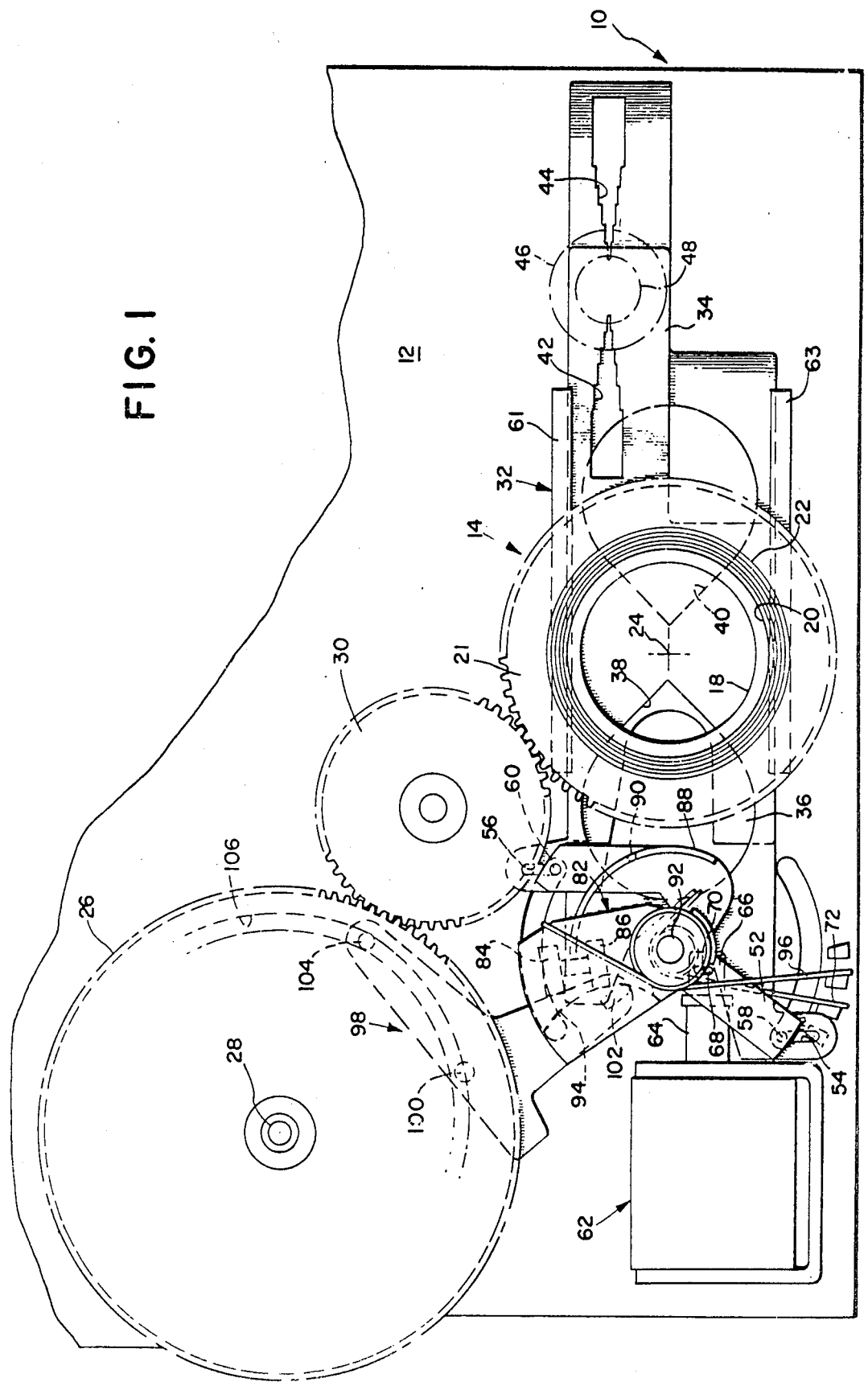
FIG. 1 is a front elevational view showing portions of the exposure and flash fire control system of this invention.
Figure 2:
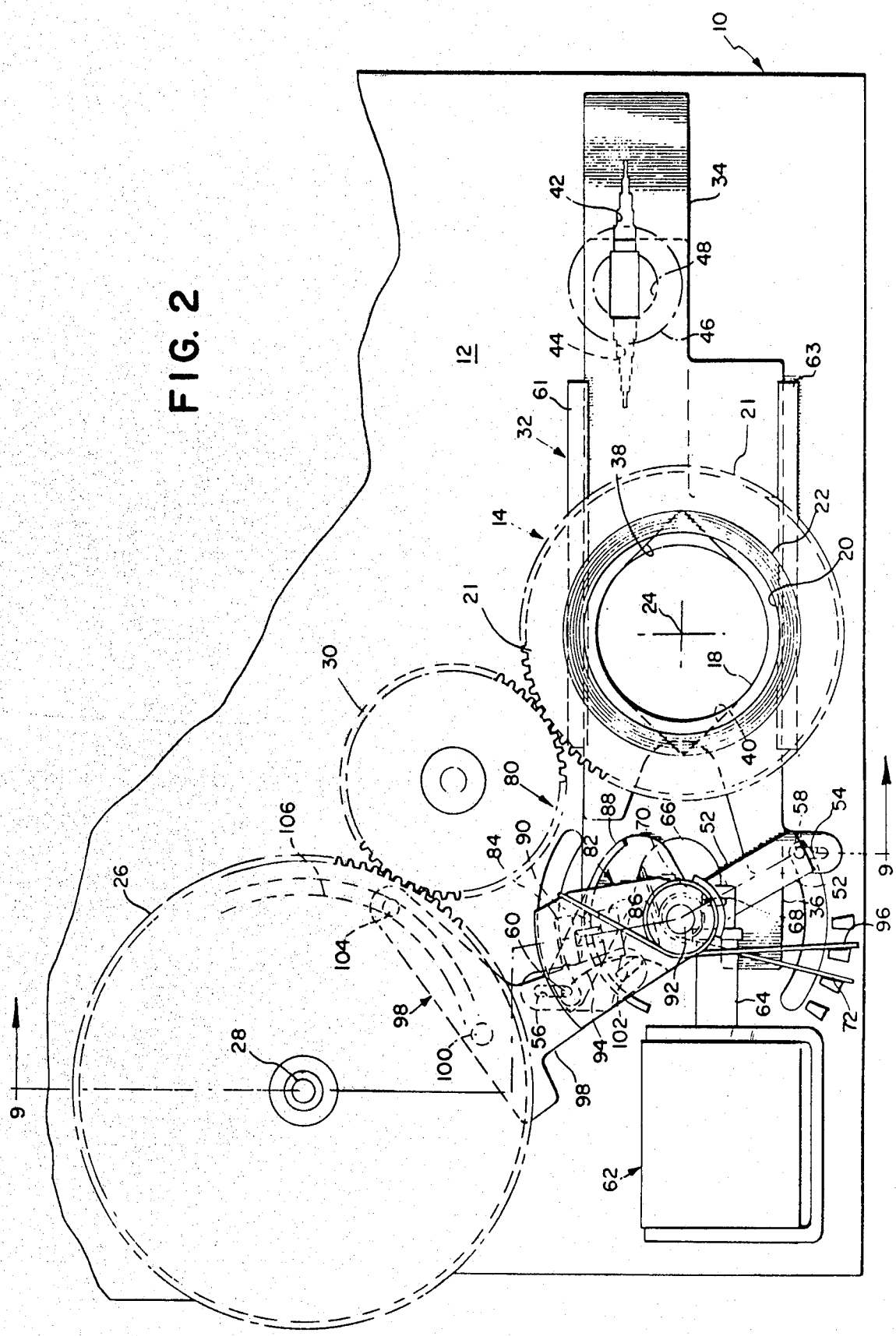
FIG. 2 is a front elevational view showing portions of the exposure and flash fire control system of FIG. 1 in a different position.

Referring now to FIGS. 1 and 2, it can be seen that the exposure and flash fire control system of this invention is associated with a photographic camera apparatus contained within a housing as shown generally at 10. A baseblock casting 12 is fixedly stationed within the housing 10 and selectively machined to support the various components of an exposure/control arrangement shown generally at 14. Centrally disposed within the baseblock casting 14, there is provided a light entry exposure opening 18 which defines the maximum available exposure aperture for the system.

An objective or taking lens 20 is provided in overlying relation to the light entry opening 18 and may comprise a plurality of individual lens elements retained in predetermined spaced relation by a cylindrical lens mount 22 which is externally threaded for toothed engagement within an internally threaded focus bezel 21. As is readily apparent, the focus bezel 21 is made rotatable with respect to the housing 10 to provide translational movement of the elements of lens 20 along a central optical axis 24 which is illustrated in FIGS. 1 and 2 as extending in a normal direction with respect to the plane of the drawing. Thus, rotation of the focus bezel 21 may be carried out either manually or automatically in a manner to be subsequently described to provide displacement of the elements of objective lens 20 for focusing of image carrying rays through the light entry exposure opening 18 to a rearwardly positioned film plane by way of a reflecting mirror, all of which are stationed within a suitable lighttight film exposure chamber within the housing 10 as illustrated in U.S. Pat. No. 3,791,278, entitled "Photographic Apparatus with Solenoid Powered Instrumentalities", by C. Biber et al., issued Feb. 12, 1974, in common assignment herewith.

A manually rotatable focus wheel 26 is shown mounted upon a pivot pin 18 along one side of the housing 10. The focus wheel 26 is formed having peripherally disposed gear teeth which mesh with the gear teeth of an idler gear 30 which, in turn, is in driving connection with external gear teeth around the cylindrical focus bezel 21. Thus, as is now readily apparent, rotation of the focus wheel 26, in turn, operates to rotate the focus bezel 21 by way of the interconnecting idler gear 30 in a manner such that the rotational orientation of the focus wheel 26 continuously corresponds with the focus setting of the objective lens 30.

Intermediate the objective lens 20 and the light entry exposure opening 18, there is provided a shutter blade mechanism 32 including two overlapping shutter blade elements 34 and 36 of the so-called "scanning type" which are mounted for counter-reciprocating sliding movement with respect to each other in a manner to be herein described. The blade elements 34 and 36 include, respectively, scene light admitting primary apertures 38 and 40 to cooperatively define a progressive variation of effective aperture openings in accordance with simultaneous overlapping displacement of one blade element with respect to the other blade element in a manner as is described in U.S. Pat. No. 3,832,722, entitled "Apparatus and System for Flash Photography", by L. Douglas, issued Aug. 27, 1974, in common assignment herewith. The apertures 38 and 40 are selectively shaped so as to overlap the light entry exposure opening 18 and thereby define a gradually varying effective aperture size as a function of the position of the blade elements 34 and 36.

Each of the blade elements 34 and 36 may additionally be configured to have corresponding photocell sweep secondary apertures as shown, respectively, at 42 and 44. Secondary apertures 42 and 44 may be configured in correspondence with the shapes of scene light admitting primary apertures 38 and 40. As is readily apparent, the secondary apertures 42 and 44 also move in correspondence with the primary apertures 38 and 40 to define a small secondary effective aperture for admitting the passage of scene light to a light detecting station as shown generally at 46. The light detecting station includes a photoresponsive element 48 which cooperates with a light integrating circuit as shown generally at 50 (FIG. 3) in a well-known manner in order to terminate the exposure as a function of the amount of light received through the secondary effective apertures 42 and 44.

The shutter blade elements 34 and 36 may be mounted to slide horizontally in any well-known manner such as by rails shown generally at 61 and 63. One end of each of the blade elements 34 and 36 includes an extended portion which pivotally connects to a walking beam 52. The walking beam 52, in turn, is disposed for rotation relative to the baseblock casting 12 by pivotal connection to baseblock casting 12 by a projecting pivot pin or stud 53 (FIG. 9) which may be integrally formed with the walking beam 52 and rotatably connected to the baseblock at a location spaced laterally apart from the light entry exposure opening 18. In the preferred mode, the walking beam 52 is generally connected at its distal ends to the shutter blade elements 34 and 36 by respective pin members 58 and 60 which extend laterally outward from the walking beam 52. The pin members are preferably circular in cross-section and extend through respective elongate slots 54 and 56 in respective blade elements 34 and 36 so as to accommodate horizontally restricted reciprocal movement of the blades 34 and 36 along a cord through the locus of rotation of the distal ends of the walking beam 52. Thus, the walking beam 52 and the horizontal blade mounting rails cooperate to provide a means for mounting the shutter blade elements 34 and 36 for displacement from an initial closed arrangement wherein the blade elements 34 and 36 preclude scene light from being transmitted along the optical path 24 to the film plane as shown in FIG. 1 to an open arrangement wherein the blade elements 34 and 36 define a maximum aperture so as to allow the passage of scene light along the optical path 24 to the film plane as shown in FIG. 2, and then to a final closed arrangement wherein the blade elements 34 and 36 again preclude scene light from being transmitted along the optical path 24 to the film plane as again shown in FIG. 1. As is readily apparent, such a displacement of the blade mechanism serves to define an exposure interval during which scene light is incident upon the film plane.

Drive means are provided for displacing the blade mechanism in the aforementioned manner and include a tractive electromagnetic device in the form of a solenoid 62 employed to displace the shutter blade elements 34 and 36 with respect to each other and the baseblock casting 12. The solenoid 62 includes an internally disposed cylindrical plunger unit 64 which retracts inwardly into the body of the solenoid upon energization of the solenoid 62 winding (see FIG. 3). The solenoid plunger 64 includes an end cap 66 at the outside end thereof together with a vertical slot or groove 68 within the end cap 66 for loosely engaging a pin 70 extending outwardly from the walking beam 52. In this manner, the solenoid plunger 64 is affixed to the walking beam 52 so that longitudinal displacement of the plunger 64 will operate to rotate the walking beam 52 around its pivot pin 53 so as to appropriately displace the shutter blade elements 34 and 36. The drive means may additionally include a torsion spring 72 so as to continuously urge the end cap 66 outward of the solenoid 62 thereby also continuously urging the blade elements 34 and 36 toward the largest effective aperture defining position over the light entry exposure opening 18. As will be readily understood, in some shutter blade arrangements, it may be preferable to utilize a tension spring or a compression spring in place of the torsion spring 72. Thus, with the spring connection herein described, the exposure and flash fire control system of this invention is biased to continuously urge the shutter blade elements 34 and 36 into an open orientation.

In the present arrangement, the shutter blades 34 and 36 are drawn from their open position to their closed position when the solenoid 62 is energized. Consequently, energization of solenoid 62 prevents the shutter blades 34 and 36 from moving towards their maximum aperture defining position under the urging of spring 72. However, as should be readily understood, the exposure and flash fire control system of this invention would be equally applicable to photographic systems where the blades 34 and 36 are spring biased in a normally closed position. In addition, the invention herein described would be equally applicable to cameras of the reflex or non-reflex type. For cameras of the reflex type, such as Polaroid's SX-70 cameras, the shutter blade elements normally remain in an open orientation and are closed upon the initial actuation of the camera to implement a photographic exposure cycle in a well-known manner. For cameras of the non-reflex type, however, such as Polaroid's Pronto! and OneStep cameras, a latch mechanism may be provided so that the blades may be maintained in a closed orientation regardless of the continued energization of the solenoid 62 and its attendant battery drain in a manner as is more fully described in U.S. Pat. No. 4,040,072.

Figure 9:
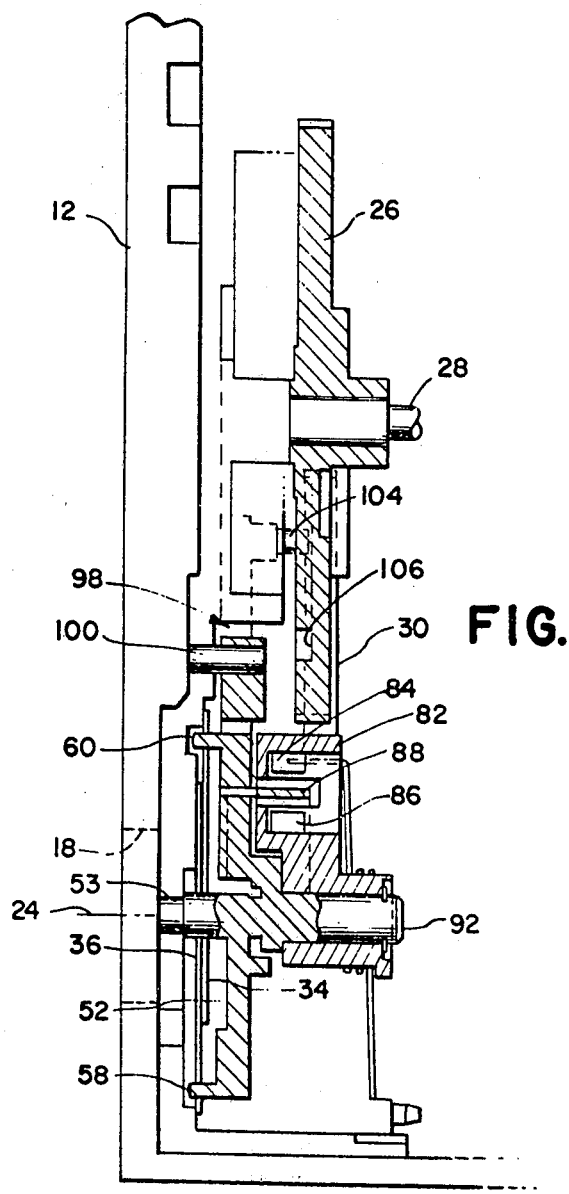
FIG. 9 is a cross-sectional view taken across the lines 9—9 in FIG. 2.

A range responsive flash fire sensing arrangement as shown generally at 80 (FIG. 3) comprises a rotatable sensor plate 82 disposed for rotation with respect to the baseblock casting 12 by a pivot pin 92 coaxially connected with respect to the pivot pin 53 (FIG. 9). The sensor plate 82 holds an LED 84 and a photoresponsive element 86 in spaced apart relation with respect to each other. An integral arcuate flange 88 extends laterally outward from the walking beam 52 and between the locus of rotation of the LED 84 and photoresponsive element 86 so as to block the light from the LED from reaching the photoresponsive element 86. The arcuate flange 88 includes a slit 90 thereacross which when aligned between the LED 84 and the photoresponsive element 86 allows the light from the LED to reach the photoresponsive element 86 and thereby provide the range responsive flash fire signal.

The sensor plate 82 further includes an integral profile cam surface 94 which is continuously engaged by a cam mover pin 102 from a bell crank 98 disposed for rotation with respect to the baseblock casting 12 by an interconnecting pivot pin 100. The sensor plate 82 is yieldably biased by a torsion spring 96 to rotate in a counterclockwise direction thereby maintaining the cam surface 94 in continuous contact against the mover pin 102. The bell crank 98, in turn, includes a cam follower pin 104 engaged to follow a face groove cam 106 formed within the inward face of the focus wheel 26.

Figure 3:
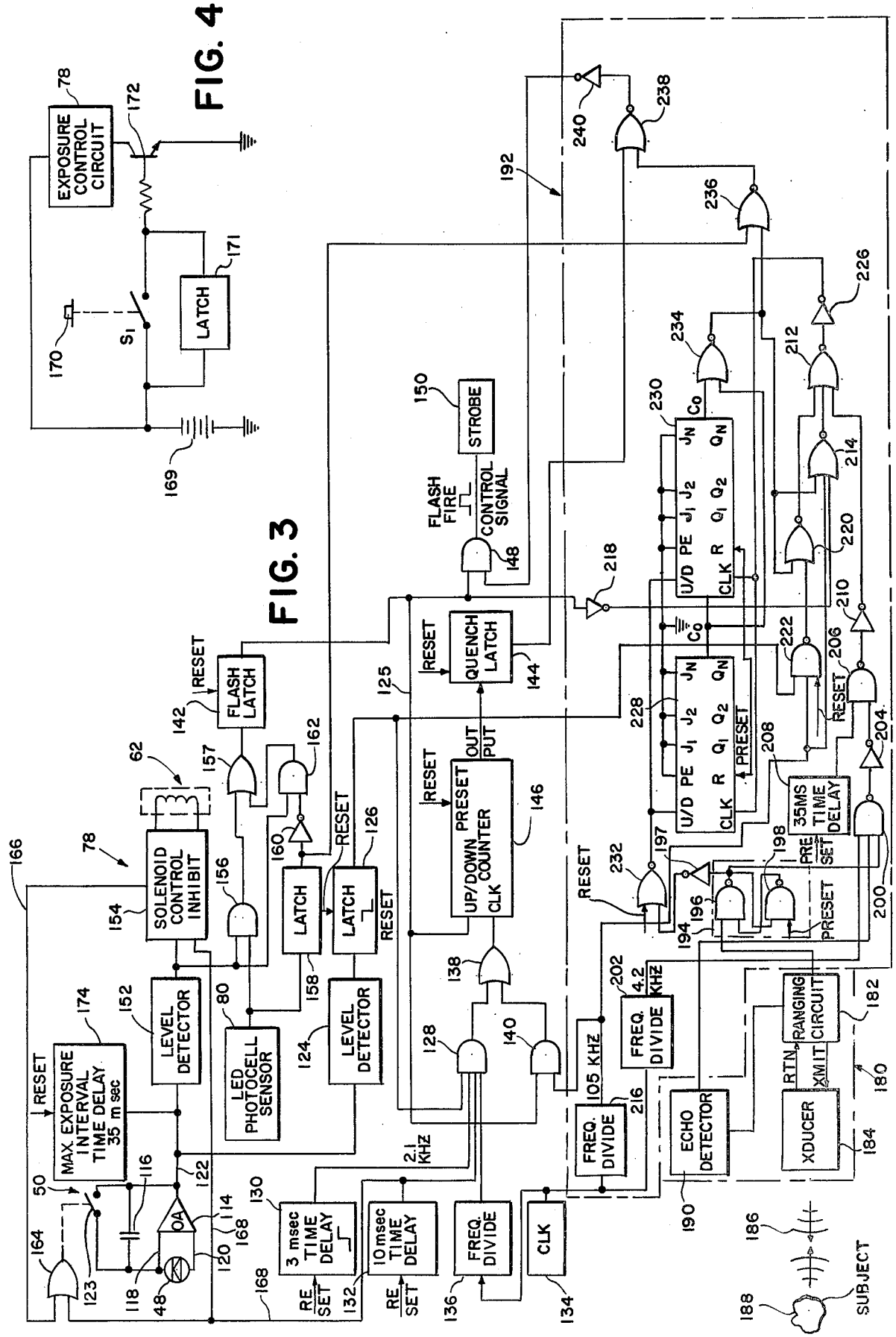
FIG. 3 is a schematic circuit diagram of the exposure and flash fire control system of this invention.

Turning now to FIG. 3, there is shown generally at 78 a schematic diagram for the exposure and flash fire control circuitry of this invention including the aforementioned scene light integrating circuit shown generally at 50. The circuit includes the photoresponsive element 48 which may be a photoresponsive cell of the type generating an output signal in correspondence with the levels of the scene light intensity incident thereon. The photoresponsive element 58 is oriented to evaluate the light levels of a scene coincident with the field of view of the lens system of the camera and operates in conjunction with the above-described aperture scanning arrangement which alters the amount of the scene light reaching the photoresponsive element 48 in correspondence with the progressively changing primary aperture size. The photoresponsive element 48 is coupled with an amplifier stage 114 along input lines 118 and 120 wherein the amplifier 114 is of a type sometimes referred to in the art as an "operational amplifier" which may be of a differential variety preferably fabricated in miniaturized form. When considered ideally, the amplifier 114 has infinite gain and infinite input impedance and a zero output impedance.

By virtue of a feedback path comprising an integration capacitor 116 connected between the input line 118 and an output line 122 from the operational amplifier 114, the photoresponsive element 48 is permitted to operate into an apparent low input impedance so as to function in a current mode, the current generated by the photoresponsive element 48 being limited substantially only by its internal impedance. Thus, under such loading, the photoresponsive element 48 in conjunction with the operational amplifier 114 and capacitor 116 is capable of providing a desirable linear output corresponding to the time integration of scene light intensity incident to the photoresponsive element 48.

Any difference of potential supplied by the photoresponsive element 48 across input leads 118 and 120 causes a voltage to be produced at output line 122. Relatively low signal voltages at the input of amplifier 114 which are present with the relatively low signal current from the photoresponsive element 48 are acted upon by the correspondingly high gain characteristic of the amplifier. Thus, although the amplifier 114 has a very high input impedance, the photoresponsive element 48, when connected in the circuit described, experiences only a very low impedance. Therefore, the current output of the photoresponsive element 48 is directed into the feedback path.

The initial charging of the integration capacitor 116 starts in synchronism with the opening of a parallel connected switch 123 in a manner to be subsequently described herein. The output signal from the light integrating circuit 50 at line 122 is directed to a first level detector 124 which may be of any conventional design such as a Schmidt trigger. The trigger or trip level (see FIG. 5) for the detector 124 is established at a value substantially less than the value representing the optimum film exposure for reasons which will become apparent from the following discussion. The output signal from the level detector 124 is directed to a latch circuit 126 which switches from a high (binary logic 1) output signal level to a low (binary logic 0) output signal level upon the input voltage to the detector 124 reaching its aforementioned trip level.

The output signal from the latch 126, in turn, is directed to one input terminal of an AND gate 128. The AND gate 128 receives additional input signals from a first time delay circuit 132 which initially assumes a high (binary logic 1) output signal level upon being reset, and from a second time delay circuit 130 which initially assumes a low (binary logic 0) output signal level upon being reset. The AND gate 128 also receives a 2.1 kHz pulse train signal derived from a 420 kHz clock pulse signal from a clock circuit 134. The 420 kHz output clock pulse from the clock circuit 134 is subsequently slowed by a frequency divide circuit 136 to provide the 2.1 kHz pulse train. The output signal from the AND gate 128 is thereafter directed to an OR gate 138 which, in turn, provides an output clock signal to an up/down counter as shown at 146. The OR gate 138 receives another input signal from an AND gate 140 which, in turn, receives a 105 kHz clock pulse signal from a frequency divide circuit 216 derived from the clock circuit 134. The up/down counter 146 receives both a preset count by way of the reset input terminal and a mode select input signal from a flash latch circuit 142 by way of an interconnecting line 125. The output signal from the flash latch circuit 142 is also directed to the other input terminal to the AND gate 140 by way of the interconnecting line 125. The up/down counter 146, in turn, provides an output signal to a quench latch circuit 144 which, in turn, provides an output signal to the full range variable proportional fill flash circuit of this invention as shown generally at 192 to be described in the following discussion. The other input terminal to the AND gate 148 receives an input signal from the flash latch circuit 142 and, in turn, provides a flash fire control signal to fire and quench an electronic flash of the quench type as shown generally at 150. As is well known in the art, the flash fire control signal is generally a square wave wherein the leading edge of the flash fire signal is utilized to fire the electronic flash and the trailing edge of the flash fire signal is utilized to quench the electronic flash.

The output signal from the light integrating circuit 50 at line 122 is also directed to another level detector circuit 152 which may also be of any conventional design such as a Schmidt trigger. The trigger or trip level established by the level detector 152 is also preferably less than the level representative of an optimum film exposure for reasons which will become apparent from the following discussion. The output signal from the level detector 152 is directed to a solenoid control circuit as shown generally at 154 which operates to control the solenoid 62 in a manner as is more fully described in U.S. Pat. No. 3,791,278, supra. The output signal from the level detector 152 is also directed to an AND gate 156, the output of which is directed to the flash latch circuit 142 by way of an OR gate 157. The output from the LED/photocell sensor arrangement 80 is directed to the other input terminal of the AND gate 156 and also to a latch circuit 158. The output from the latch 158, in turn, is inverted by an inverter gate 160 and thereafter directed to an input terminal of an AND gate 162. The AND gate 162 receives another input signal from the output of the level detector 152 and, in turn, provides an input signal to the OR gate 157.

The switch 123 is synchronized by way of an OR gate 164 which receives one input signal from the solenoid control circuit 154 by way of an interconnecting line 166. The OR gate 164, in turn, receives another input signal from the time delay circuit 132 by way of an interconnecting line 168 for reasons which will become more apparent from the following discussion.

Figure 4:
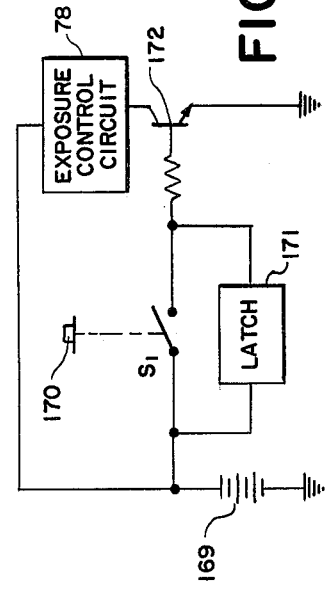
FIG. 4 is a schematic circuit diagram showing additional circuitry for powering and actuating the exposure and flash fire control circuit of FIG. 3.

The exposure and flash fire control circuit 78 as shown in FIG. 3 is preferably energized from a battery 164 as shown in FIG. 4. A photographic exposure cycle is commenced by depressing an actuator button 170 which, in turn, operates to close a switch S₁ to apply battery power to the exposure in flash control circuit 78 by turning on a ground return control transistor 172. As is readily apparent, the battery supply voltage will be maintained in connection to the exposure and flash fire control circuit 78 only as long as the photographer maintains the button 170 in its depressed state which may be perfectly adequate for situations where the human reaction time in depressing and releasing the button 170 substantially exceeds the longest exposure cycle time likely to be incurred. However, in situations where the normal exposure cycle time is likely to exceed the human reaction time in depressing and releasing the button 170, there may be provided a latch circuit, as shown generally at 171, in parallel connection with respect to the switch S₁ for maintaining continuous energization of the exposure and flash fire control circuit 78 even after release of the button 170 and the opening of switch S₁. A suitable automatic latch circuit is more fully described in U.S. Pat. No. 3,744,385, entitled "Control System for Photographic Apparatus", by J. Burgarella et al., issued July 10, 1973, in common assignment herewith.

Focusing is preferably accomplished by an automatic focusing arrangement utilizing a sonic rangefinder 180 of a type more fully described in U.S. Pat. No. 4,199,246, entitled "Ultrasonic Ranging System for a Camera", by J. Muggli, issued Apr. 22, 1980, and U.S. Pat. No. 4,167,316, entitled "Sonar Controlled Lens Focus Apparatus", by B. K. Johnson et al., issued Sept. 11, 1979, in common assignment herewith and how incorporated by reference herein. The sonic rangefinder 180 includes a ranging circuit 182 which is responsive to manual actuation of the button 170 to issue a transmit commence signal to a sonic transducer 184 so as to cause the transmission of a sonar ranging signal comprising a burst of sonic energy as shown generally at 186. The burst of sonic energy 186 is emitted from the transducer 184 in substantial coincidence with the manual actuation of the button 170. The transducer 184 thereafter detects an echo signal reflected from a photographic subject as shown at 188 at an elapsed time interval subsequent to the transmission of the sonar ranging signal. An echo detector 190 then provides a signal indicative of this elapsed time period which corresponds directly to the distance between the camera and the subject 188 to be photographed. The sonic rangefinder 180 thus provides a means for providing an indication of an elapsed time period which corresponds directly to the distance between the camera and the subject to be photographed for reasons which will become more apparent from the following paragraphs.

The output signals from the sonar rangefinder 180 are directed to the full range proportional fill flash circuit of this invention as shown generally at 192. More specifically, the transmit signal from the ranging circuit 182 is directed to one input terminal of a latch circuit 194 comprising a pair of NAND gates 196 and 198. The output from the latch circuit 194, in turn, is directed to one input terminal of a NAND gate 200 which also receives other input signals respectively from the echo detector 190 and from the clock 134 by way of a frequency divide circuit 202 which provides a 4.2 kHz output pulse train. The output signal from the NAND gate 200, in turn, is inverted by an inverter gate 204 and thereafter directed to one input terminal of a NAND gate 206, the other input terminal to which receives a signal from a third time delay circuit of 35 milliseconds as shown at 208. The output from the NAND gate 206 is again inverted by an inverter gate 210 and thereafter directed to an input terminal of a NOR gate 212. The NOR gate 212 receives another input signal from the output terminal of a NOR gate 214 which, in turn, is connected to receive one input signal from the output terminal of the flash latch 142 by way of an inverter gate 218, another input signal from the clock 134 by way of the frequency divide circuit 216 which provides the 105 kHz output pulse train, and still another output signal from the output terminal of another NOR gate 234. The NOR gate 212 receives another input signal from the output terminal of another NOR gate 220 which is also connected to receive one input signal from the output terminal of the NOR gate 234. The NOR gate 220, in turn, receives another input signal from the output terminal of a NAND gate 222 which, in turn, is connected to receive input signals respectively from the frequency divide circuit 216, and the output terminal of the level detector latch 126. The NAND gate 222 also receives a reset input signal which will be more fully described in the following discussion. The output from the NOR gate 212, in turn, is inverted by an inverter gate 226 and directed to the clock input terminals of two serially-connected up/down counters as shown at 228 and 230.

The up/down counters 228 and 230 may be signalled to assume either an up or down count mode of operation by the output signal provided from a NOR gate 232 connected to receive one input signal from the latch 194 by way of an inverter gate 197. The NOR gate 232 also receives a reset input signal which will also be more fully described by the following discussion. The zero count output signals from the counters 228 and 230 are directed, respectively, to the input terminals of the NOR gate 234 which provides an output signal to the input terminals of NOR gates 220 and 214, respectively, and into one input terminal of another NOR gate 236. The NOR gate 236 receives another input signal from the output terminal of the latch 158 and, in turn, provides an output signal level to one input terminal of still another NOR gate 238. The other input terminal to the NOR gate 238 is provided with the output signal from the quench latch 144. The output signal from the NOR gate 238, in turn, is inverted by an inverter gate 240 and thereafter directed to one input terminal of the AND gate 148.

After the photographer has composed and framed the subject to be photographed, he may thereafter initiate a fully automatic photographic exposure cycle by depressing the button 170 so as to close the switch S₁ and thereby apply battery 169 supply voltage to energize the exposure and flash fire control circuit 78 by turning on the ground return control transistor 172. As is readily apparent, it may be assumed that the electronic flash 150 is in its fully charged ready condition prior to the photographer actuating the button 170 as is well known in the art. As previously discussed, the sonic rangefinder 180 responds to the energization of the exposure and flash fire circuit 78 by issuing a transmit commence signal to the sonic transducer 184 so as to cause the transmission of the sonar ranging signal 186.

Simultaneously with the transmission of the sonar ranging signal, there is provided a preset signal to the up/down counters 228 and 230 to reset the counters and enable them to start counting in synchronism with the transmission of the sonic ranging signal 186. A reset signal comprising a low (binary logic 0) signal level is applied simultaneously to one input terminal of the NOR gate 232 and to one input terminal of the NAND gate 222. The other input terminal to the NOR gate 232 is already at a low (binary logic 0) input signal level for reasons which will become apparent from the following discussion, and thus the NOR gate 232 provides a high (binary logic 1) output signal level to the up/down mode select terminals of the counters 228 and 230 so as to enable the counters to operate in an up count mode of operation. The low (binary logic 0) input reset signal level to the NAND gate 222 operates to set the output therefrom at a high (binary logic 1) output signal level regardless of the input signal levels at the other two input terminals to the NAND gate 222. In this manner, the low (binary logic 0) input signal level to the NAND gate 222 operates to disable the NAND gate 222 from gating through the 105 kHz pulse train.

Simultaneously with the issuance of a transmit commence signal to the sonic transducer 184, there is provided a high (binary logic 1) input signal level to one input terminal of the NAND gate 196 of the latch 194. Since the aforementioned high (binary logic 1) preset signal level is applied to one input terminal of the NAND gate 198, the latch 194 switches to provide a high (binary logic 1) output signal level which is thereafter inverted by the inverter gate 197 to provide a low (binary logic 0) input signal level to the other input terminal of the NOR gate 232. Thus, the NOR gate 232 provides a high (binary logic 1) output signal level to the mode select terminals of the counters 228 and 230 as previously described. The high (binary logic 1) output signal level from the latch 194 is also simultaneously applied to one input terminal of the NAND gate 200. Prior to the detection of the echo signal from the photographic subject, the echo detector 190 provides a high (binary logic 1) output signal level to another input terminal of the NAND gate 200. Thus, the NAND gate 200 is enabled to gate through the 4.2 kHz pulse train received from the frequency divide circuit 202. The 4.2 kHz clock pulse is inverted by the inverter gate 204 and applied to one input terminal of the NAND gate 206. The 35 millisecond time delay circuit 208 is also preset by the aforementioned high (binary logic 1) preset signal to start timing in synchronism with the transmission of the sonar ranging signal.

Prior to the expiration of the 35 millisecond time delay, the time delay circuit 208 provides a high (binary logic 1) output signal level to the other input terminal of the NAND gate 206 so as to enable the NAND gate 206 to gate through the 4.2 kHz pulse train. The 4.2 kHz pulse train is thereafter inverted by the inverter gate 210 and directed to one input terminal of the NOR gate 212. Whereas prior to the reset signal there is applied a low (binary logic 0) signal level to one input terminal of the NAND gate 222, the output signal from the NAND gate 222 is a high (binary logic 1) signal level which is applied to one input terminal of the NOR gate 220 thereby gating the NOR gate 220 to provide a low (binary logic 0) output signal level to one other input terminal of the NOR gate 212. The third input terminal to the NOR gate 212 also receives a low (binary logic 0) input signal level from the output terminal of the NOR gate 214 for reasons which will become apparent from the following discussion. Thus, the NOR gate 212 is enabled to gate through the 4.2 kHz pulse train which is subsequently inverted by the inverter gate 226 and applied to the clock input terminals of the counters 228 and 230. In this manner, the counters 228 and 230 are enabled to start counting up the pulses from the 4.2 kHz pulse train in synchronism with the transmission of the sonar ranging signal.

Detection of an echo signal from the photographic subject results in the output signal level from the echo detector 190 switching to a low (binary logic 0) output signal level which is directed to one input terminal of the NAND gate 200 thereby disabling the NAND gate 200 from further gating through the 4.2 kHz pulse train to the counters 228 and 230. The counters 228 and 230 thus receive and store a pulse train count which is proportional to the subject distance from the camera since the camera counters 228 and 230 are synchronized to start counting the 4.2 kHz pulse train in synchronism with the transmission of the sonar ranging signal and thereafter signalled to stop receiving the 4.2 kHz pulse train upon detection of the echo signal from the subject.

In the event that the photographic subject is located at a greater distance from the camera than a predetermined maximum distance, which may be in the order of 12 feet, the 35 millisecond time delay 208 switches to provide a low (binary logic 0) input signal level to one input terminal of the NAND gate 206 thereby disabling the NAND gate 206 from further gating through the 4.2 kHz pulse train to the counters 228 and 230.

The sonic rangefinder 180 operates in conjunction with an automatic focus control (not shown) which is fully described in U.S. Pat. No. 4,199,246, supra, and U.S. Pat. No. 4,167,316, supra. Automatic focusing is accomplished by the automatic focus control rotating the focus wheel 26 which, in turn, operates by way of the idler gear 30 to rotate the focus bezel 21 and thereby axially displace the elements of the taking lens 20 to achieve the appropriate focus condition. Rotation of the focus wheel 26 and its associated face groove cam 106 operates to displace the cam follower pin 104 so as to rotate the bell crank 98 about its pivot pin 100. Rotation of the bell crank 98, in turn, operates by way of the cam mover pin 102 engaging the profile cam surface 94 to rotate the sensor plate 82 about its pivot pin 92. In this manner, the sensor plate 82 and its associated LED 84 and photoresponsive element 86 are positioned in accordance with the range of the subject to be photographed along a locus of rotation adjacent the walking beam 52 locus of rotation. The LED/photocell combination can thus respond at any one of its positions along its locus of rotation to the slit 90 and the walking beam flange 88 subsequently reaching an aligned position between the LED 84 and photoresponsive element 86 in which the shutter blade elements define an effective aperture value corresponding to the subject range. Thus, the slit 90 may be subsequently rotated during an exposure interval to unblock the light path between the LED 84 and the photoresponsive element 86 when the blade mechanism reaches the aperture defining position corresponding to the subject range adjusted position of the sensor plate 82.

Subsequent to transmission of the sonar ranging signal 86 and receipt of the echo signal from the subject by the sonar rangefinder 180, the exposure and flash fire control circuit 78 operates in a well-known manner to provide a reset signal to reset the appropriate latch and time delay circuits as well as the up/down counter 146 to a predetermined preset number of counts which, for this example, may be eight pulse counts. The time delay circuit 132 is reset to provide a high (binary logic 1) output signal level for a predetermined time interval or, preferably, 10 milliseconds. The signal from the circuit 132 is, in turn, directed to an inhibit input terminal of the solenoid control circuit 154 by way of interconnecting line 168. Receipt of the inhibit signal by the solenoid control circuit 154 operates to delay the energization of the solenoid 62 so as to leave the plunger 64 in its withdrawn position with the shutter blade elements 34 and 36 in the scene light unblocking position as shown in FIG. 2.

The time delay circuit 130 is also reset subsequent to the operation of the sonar rangefinder 180 to provide a low (binary logic 0) output signal level which operates to inhibit the gating of the 2.1 kHz pulse train from the frequency divide circuit 136 by the AND gate 128 for an initial time period, preferably 3 milliseconds, after which the output signal changes to a high (binary logic 1) signal level. Thus, the high (binary logic 1) output signal level from the time delay circuit 132 together with the high (binary logic 1) output signal level from the latch 126 resulting from the initial reset thereof operates subsequent to the expiration of the 3 millisecond time delay circuit 130 to enable the AND gate 128 to gate through the 2.1 kHz pulse train from the frequency divide circuit 136 into the counter 146 by way of the OR gate 138 for the remainder of the 10 millisecond time delay of circuit 132.

Subsequent to the operation of the sonar rangefinder 180 and simultaneously with the provision of the aforementioned reset signals, the exposure and flash fire control circuit 78 operates in a well-known manner to switch the signal levels of the aforementioned preset signals to the full range proportional fill flash circuit 192. The reset signal to one input terminal of the NOR gate 232 is also switched from a low (binary logic 0) input signal level to a high (binary logic 1) input signal level thereby switching the NOR gate 232 to provide a low (binary logic 0) output signal level to the mode select terminals of the counters 228 and 230 so as to switch the counters 228 and 230 to a down count mode of operation.

As is also readily apparent, upon receipt of the echo signal, the echo detector 190 is switched to a low (binary logic 0) signal level which is directed to one input terminal of the NAND gate 200 so as to disable the AND gate 200 from further gating through the 4.2 kHz pulse train from the frequency divide circuit 202. The reset signal directed to one input terminal of the NAND gate 222 is also switched from a low (binary logic 0) input signal level to a high (binary logic 1) input signal level thereby enabling the NAND gate 222 to gate through the 105 kHz pulse train received from the frequency divide circuit 216 since the input terminal connected to receive the output signal from the latch 126 is already at a high (binary logic 1) input signal level. The 105 kHz pulse train gated by the NAND gate 222 is directed to one input terminal of the NOR gate 220 which is also enabled to gate through the 105 kHz pulse train since its other input terminal is at a low (binary logic 0) input signal level derived from the output signal from the NOR gate 234.

Since the counters 228 and 230 are preloaded during the operation of the sonar rangefinder 180 in the aforementioned manner, the output signal levels from the zero count terminals $C_0$ are at high (binary logic 1) signal levels thereby inputting the NOR gate 234 so as to assure the low (binary logic 0) output signal therefrom. One input terminal to the NOR gate 214 receives a high (binary logic 1) signal level from the output terminal of the flash latch 142 by way of the inverter gate 218 so as to provide a low (binary logic 0) output signal level to one input terminal of the NOR gate 212. Another input terminal to the NOR gate 212 receives a low (binary logic 0) input signal level from the NAND gate 206 by way of the inverter 210 resulting from either receipt of an echo signal or termination of the 35 millisecond time delay. Thus, the NOR gate 212 is enabled to gate through the 105 kHz pulse train received from the NOR gate 220 which pulse train is subsequently inverted by the inverter gate 226 and thereafter directed to the clock input terminals of the counters 228 and 230, respectively. In this manner, the counters 228 and 230 are enabled to count down the individual pulses from the 105 kHz pulse train received from the frequency divide circuit 216 so as to offset them against the pulses previously counted from the 4.2 kHz pulse train during the sonar ranging operation in synchronism with the rsetting of the time delay circuits 130 and 132, the up/down counter 146, and the latches 126, 142 and 144.

The high (binary logic 1) output signal level derived from the time delay circuit 132 upon its resetting in the aforementioned manner is also simultaneously directed to one input terminal of the OR gate 164 so as to provide a high (binary logic 1) output signal level therefrom which is effective to open the switch 123 and thereby commence scene light integration. The photoresponsive element 48 provides an appropriate voltage response corresponding to the ambient scene light intensity thereon which voltage response is thereafter integrated by the operational amplifier 114 and feedback capacitor 116 to provide an output signal representative of the time integration of the ambient scene light intensity incident to the photoresponsive element 48.

Under conditions of relatively low ambient scene light intensity where, for example, the ambient scene light intensity is equal to or less than a select level such as 2 c/ft.$^2$, the scene light integration curve will have a relatively flat slope equal to or less than the integration curve 2 c/ft.$^2$ as shown in FIG. 5. The 2 c/ft.$^2$ level of scene light intensity is preferably selected to correspond to the maximum level of scene light intensity which will have a negligible film exposure influence during a maximum exposure interval allowable without incurring any adverse blurring effects from the normally expected hand motion of the photographer for a select film speed and exposure aperture size. For the example herein described, the maximum allowable exposure interval is in the order of 35 milliseconds.

Assuming now in the foregoing example that the ambient scene light intensity is relatively low, i.e., 2 c/ft.$^2$ or less, then the scene light integration will proceed at a rate no greater than the curve 2 c/ft.$^2$ of FIG. 5 and trigger the level detector 124 at a time no less than $T_2$. Triggering the level detector 124, in turn, operates to trigger the latch 126 to switch from a high (binary logic 1) output signal level to a low (binary logic 0) output signal level thereby gating off the 2.1 kHz clock pulse train from the frequency divide circuit 136.

As is readily apparent, the counters 228 and 230 of the full range proportional fill flash circuit 192 of this invention will also operate during the scene light integration to count down the 105 kHz pulse train received from the frequency divide circuit 216. Since the scene light intensity is low, the scene light integration will proceed at a rate that will enable the counters 228 and 230 to empty prior to the latch 126 switching to a low (binary logic 0) output signal level which disables the NAND gate 222 from further gating through the 105 kHz pulse train to the counters 228 and 230. Upon the counters 228 and 230 counting down to zero, there will be provided low (binary logic 0) signal levels to respective input terminals of the NOR gate 234 thereby causing the NOR gate 234 to switch to a high (binary logic 1) output signal level which is directed to one input terminal of the NOR gate 236. The NOR gate 236 thereby provides a low (binary logic 0) output signal level to one input terminal of the NOR gate 238. Prior to the strobe 150 being fired, the quench latch circuit 144 provides a high (binary logic 1) output signal level which is subsequently directed to the other input terminal of the NOR gate 238 so as to cause the NOR gate 238 to provide a low (binary logic 0) output signal level which is thereafter inverted by the inverter gate 240 to provide a high (binary logic 1) input signal level to one input terminal of the AND gate 148.

The initial reset of the flash latch circuit 142 at the commencement of the pre-exposure scene light integration operates to provide a low (binary logic 0) output signal level which is directed by way of the interconnecting line 125 to one input terminal of the AND gate 140 so as to inhibit the gating through of the 105 kHz pulse train therethrough. In addition, the initial low (binary logic 0) output signal level from the flash latch 142 is also directed by way of the interconnecting line 125 to select an up mode of count for the counter 146. The initial low (binary logic 0) output signal from the flash latch 142 is also inverted by the inverter gate 218 and directed to one input terminal of the NOR gate 214 so as to disable the NOR gate 214 from gating the 105 kHz pulse train from the frequency divide circuit 216 until the strobe is fired in a manner to be subsequently described.

Thus, under the aforementioned condition of low ambient scene light intensity, either equal to or less than 2 c/ft.$^2$, the 2.1 kHz pulse train from the frequency divide circuit 136 is gated by the AND gate 128 and the NOR gate 138 to the up/down counter which as previously discussed operates in an up count mode. The counter 146 is preset at eight counts and continues to count up from the termination of the 3 millisecond time delay to the termination of the 10 millisecond time delay for a total of 25 counts. If the ambient scene light is exactly 2 c/ft.$^2$, the scene light integration will proceed at a rate sufficient to trigger the level detector 124 and latch 126 in synchronism with the expiration of the 10 millisecond time delay as most clearly shown in FIG. 5. If the ambient scene light intensity is less than 2 c/ft.$^2$, then the scene light integration will occur at a slower rate and the 10 millisecond time delay will expire to terminate the up count to the counter 146 before the level detector 124 is triggered. Thus, the maximum up count that can be provided to the counter 146 is 25 counts regardless of how low the ambient scene light intensity decreases.

The expiration of the 10 millisecond time delay in addition to inhibiting the AND gate 128 also operates by way of the interconnecting line 168 to switch the OR gate 164 and thereby provide a low (binary logic 0) output signal level to close the switch 123 and thereby discharge the integration capacitor 116. The low (binary logic 0) output signal level from the 10 millisecond time delay circuit 132 also simultaneously operates by way of the interconnecting line 168 to remove the inhibit signal from the solenoid control 154 so as to energize the solenoid 62 winding to retract the plunger 64 and thereby rotate the walking beam 52 in a counterclockwise direction as viewed from FIGS. 1 and 2 against the biasing force of spring 72 thereby moving the shutter blade elements into the light blocking position as shown in FIG. 1.

The aforementioned pre-exposure flash fire control ambient scene light measurement operates to input the counter 146 in a manner whereby the stored counts may be subsequently retrieved during the actual exposure interval to control the duration of the flash fire signal in a manner as is fully described in U.S. patent application Ser. No. 113,042, entitled "Variable Proportional Fill Flash", by R. Coppa et al., filed Jan. 17, 1980. In addition, the pre-exposure flash fire control ambient scene light measurement simultaneously operates to input the counters 228 and 230 of the full range proportional fill flash circuit 192 in the manner of this invention whereby the count stored by the counters 228 and 230 is representative of both camera-to-subject range and ambient scene light intensity and may be subsequently retrieved during the actual exposure interval to control the duration of the flash fire signal. Under the aforementioned conditions of low ambient scene light intensity, the counters 228 and 230 empty during the pre-exposure flash fire control ambient scene light measurement regardless of whether the counters 228 and 230 had previously been filled during the operation of the sonar rangefinder 180 and thus provide no effective control for the strobe duration as will become apparent from the following discussion. As should now be readily apparent, the aforementioned pre-exposure flash fire control ambient scene light measurement occurs with the shutter blade elements 34 and 36 in the scene light unblocking position as shown in FIG. 2 without exposing the film since the film plane is covered by a rotatable mirror (not shown) in a manner as is more fully described in U.S. Pat. No. 3,791,278, entitled "Photographic Apparatus with Solenoid Powered Instrumentalities", by C. Biber, issued Feb. 12, 1974, in common assignment herewith and now incorporated by reference herein. After the shutter blade elements 34 and 36 are moved into the scene light blocking position of FIG. 1, the aforementioned rotatable mirror is moved out of scene light blocking relation with respect to the film plane in a well-known manner as is again described in U.S. Pat. No. 3,791,278, supra. With the film plane unblocked, the exposure interval is commenced upon the deenergization of the solenoid 62 by the solenoid control circuit 154 which simultaneously operates by way of the interconnecting line 166 to provide a high (binary logic 1) output signal level to the OR gate 164 thereby again opening the switch 123 to commence scene light integration in synchronism with the shutter blade opening movement.

Deenergization of the solenoid 62 operates to release the shutter blade elements 34 and 36 to move under the urging influence of the drive spring 72 from the scene light blocking arrangement as shown in FIG. 1 toward the maximum aperture defining position as shown in FIG. 2 so as to define a continuous ever-increasing progression of effective apertures over the optical center axis 24. The photocell sweep secondary apertures 42 and 44 also define a continuous progression of ever-increasing apertures over the photoresponsive element 48. Under the aforementioned condition of low ambient scene light intensity, equal to or less than 2 c/ft.$^2$, the scene light integration will not proceed at a sufficiently rapid rate to trigger the level detector 152 prior to the expiration of the 35 millisecond time delay which is the maximum exposure allowable without incurring the adverse blurring effects from the normally expected hand motion of the photographer. The 35 millisecond time delay may be provided by a time delay circuit as shown at 174 and under the aforementioned conditions will operate to provide a sufficiently high (binary logic 1) output signal level to trigger the level detector 152 to change its output state from a low (binary logic 0) output signal level to a high (binary logic 1) output signal level thereby signalling the solenoid control 154 to energize the solenoid winding 63 and retract the plunger 64. The walking beam 52 will thereby be rotated in a counterclockwise direction as viewed from FIGS. 1 and 2 against the biasing force of spring 72 so as to move the shutter blade elements 34 and 36 back into the scene light blocking position as shown in FIG. 1.

Upon commencement of the aforementioned photographic cycle, the LED/photocell sensor arrangement 80 also provides a low (binary logic 0) output signal level since the walking beam flange 88 operates to block the light from the LED 84 from reaching the photoresponsive element 86. The output from the latch 158 is also at a correspondingly low (binary logic 0) output signal level and this low output level is provided to the inverter 160. The output from the inverter 160 is thus at a high (binary logic 1) output signal level so as to enable the AND gate 162. Initial rotation of the walking beam flange slit 90 between the LED 84 and the photoresponsive element 86 operates to unblock the light path therebetween so as to provide a high (binary logic 1) output signal level from the sensor arrangement 80. This high output level, in turn, enables the AND gate 156 and simultaneously triggers the latch 158 to provide an output pulse of high voltage level corresponding to a high (binary logic 1) output signal level. The high (binary logic 1) output signal level from the latch 158, in turn, is inverted by the inverter 160 to disable the AND gate 162 for the remainder of the exposure interval. As soon as the slit 90 passes out of alignment between the LED 84 and photoresponsive element 86, the output signal from the sensor 80 goes back to a low (binary logic 0) signal level so as to disable the AND gate 156.

Thus, under the aforementioned condition of low ambient scene light intensity equal to or less than 2 c/ft.$^2$, the walking beam flange slit 90 is rotated between the LED 84 and photoresponsive element 86 prior to the maximum exposure interval time delay circuit 174 triggering the level detector 152. As is now readily apparent, triggering the level detector 152 operates only to energize the solenoid 62 since the AND gate 156 is in a disabled state as a result of the low (binary logic 0) output signal level from the sensor 80. Energization of the solenoid 62, however, operates to reverse the direction of rotation of the walking beam 52 so as to rotate the walking beam flange slit 90 back again between the LED 84 and photoresponsive element 86 so as to provide another high (binary logic 1) output signal level to one input terminal of the AND gate 156. The other input terminal to the AND gate 156 is already enabled by the high (binary logic 1) output signal level from the level detector 152 and, therefore, switches to provide a high (binary logic 1) output signal level to actuate the flash latch circuit 142 by way of the OR gate 157 thereby switching the flash latch circuit from a low (binary logic 0) output signal level to a high (binary logic 1) output signal level.

The change in the output signal from the flash latch circuit 142 operates: to gate the AND gate 148; to select a down count mode of operation for the counter 146; to enable the AND gate 140 to gate the 105 kHz pulse train from the frequency divide circuit 216 to the OR gate 138; and to enable the NOR gate 214 to gate through the 105 kHz pulse train to the counters 228 and 230 in the manner of this invention to be subsequently described. As previously discussed, since the counters 228 and 230 have already been counted down to a zero count during the pre-exposure flash fire control ambient scene light measurement, the enablement of the NOR gate 214 in this manner is immaterial under the aforementioned conditions of low ambient scene light intensity where the full range proportional fill flash circuit 192 does not provide an effective flash control function.

The initial reset input to the quench latch circuit 144 operates to reset the quench latch to provide a high (binary logic 1) output signal level which is directed to one input terminal of the NOR gate 238 so that the NOR gate 238 provides a low (binary logic 0) output signal level which is thereafter inverted by the inverter gate 240 to a high (binary logic 1) output signal level directed to one input terminal of the AND gate 148. Thus, the switching of the flash latch circuit 142 in response to the walking beam flange slit 90 being rotated between the LED 84 and the photoresponsive element 86 during the closing movement of the shutter blade elements operates to provide the leading edge of a flash fire control signal directed to the flash 150. As previously discussed, the leading edge of the flash fire control signal operates to fire the flash 150. Thus, in the aforementioned manner, the flash is fired during the closing movement of the shutter blade elements at the effective aperture appropriate for the range of the subject to be photographed.

Simultaneously with the flash 52 being fired, the counter 146 commences counting down at the 105 kHz pulse train rate from the frequency divide circuit 216. Upon reaching a zero count, the output from the counter 146 switches to actuate the quench latch 144 and thereby switch the output therefrom to a low (binary logic 0) output signal level which is directed to one input terminal of the NOR gate 238. Since the other input terminal to the NOR gate 238 is already at a low (binary logic 0) input signal level by virtue of the high (binary logic 1) output signal level from the latch 158 being directed to one input terminal of the NOR gate 236 so as to switch the output therefrom to a low (binary logic 0) output signal level, the NOR gate 238 provides a high (binary logic 1) output signal level which is thereafter inverted by the inverter gate 240 to provide a low (binary logic 0) input signal level to the AND gate 148 thereby switching the AND gate to provide a low (binary logic 0) output signal level which operates as the trailing edge of the flash fire control signal. As previously discussed, the trailing edge of the flash fire control signal operates to quench the flash 150 in a well-known manner. Since under the foregoing condition of low ambient scene light intensity either equal to or less than 2 c/ft.$^2$ the counter 46 counts down the maximum number of counts possible (25), there is provided a long flash duration with a high flash output (i.e., 400 BCPS).

Referring now to the graph of FIG. 7 where there is shown a graphical representation of the percentage of the film exposure attributable to ambient scene light and artificial flash light plotted as a function of the variation in ambient scene light level, it can be seen that under the aforementioned condition of low ambient scene light intensity (equal to or less than 2 c/ft.$^2$), the entire exposure is directly attributable to the artificial flash light provided by the flash 150 which is controlled to provide a high flash output which may be in the order of 400 BCPS as shown in the graph of FIG. 6 where the flash output is plotted as a function of the variation in ambient scene light level.

Under conditions of intermediate or transitional ambient scene light intensity between 8 c/ft.$^2$ and 2 c/ft.$^2$, the pre-exposure flash fire control ambient scene light measurement occurs in the aforementioned manner whereupon the photoresponsive element 48 provides an appropriate voltage response corresponding to the scene light intensity incident thereon. The voltage response is thereafter integrated by the operational amplifier 114 and feedback capacitor 116 to provide an output signal representative of the time integration of ambient scene light intensity incident to the photoresponsive element 48. The output signal level at line 122 from the light integrating circuit 50 increases until reaching the trigger level of the detector 124 so as to switch the output from the level detector 124 from a low (binary logic 0) output signal level to a high (binary logic 1) output signal level thereby actuating the latch 126 to switch from a high (binary logic 1) output signal level to a low (binary logic 0) output signal level to inhibit the AND gate 128 and terminate the 2.1 kHz pulse train input to the up/down counter 146.

As is now readily apparent, under conditions of intermediate scene light intensity, the level detector 124 is triggered at some time after the minimum 3 millisecond time delay provided by the time delay circuit 130 and prior to the expiration of the 10 millisecond time delay provided by the time delay circuit 132. Thus, the number of clock pulses counted by the counter 146 corresponds directly to the level of ambient scene light intensity and is greater than the minimum preset eight clock pulse count and less than the maximum 25 clock pulse count.

The 3 millisecond time delay is also sufficient for the counters 228 and 230 of the full range proportional fill flash circuit 192 to count down to a zero count regardless of whether the counters 228 and 230 have previously been filled during the operation of the sonar rangefinder 180. Thus, the outputs from the C$_0$ terminals of the counters 228 and 230 provide low (binary logic 0) output signal levels to the NOR gate 234 which, in turn, is switched to provide a high (binary logic 1) output signal level to one input terminal of the NOR gate 236. The output signal from the NOR gate 236 thus remains at a low (binary logic 0) output signal level which is directed to one input terminal of the NOR gate 238 so as to enable the NOR gate 238 to switch in response to the output from the quench latch 144 switching. Thus, the full range proportional fill flash circuit 192 also provides no influence in controlling the duration of the flash fire signal when the ambient scene light intensity is in the intermediate range of intensity between 8 c/ft.$^2$ and 2 c/ft.$^2$ and the flash fire control signal is provided in the manner as is fully described in U.S. patent application Ser. No. 113,042, supra.

A photographic exposure interval is thereafter subsequently commenced in the aforementioned manner with the flash latch 142 being actuated at the appropriate instant during the photographic exposure cycle to provide the leading edge of the flash fire control signal while simultaneously actuating the counter 146 to operate in a countdown mode and enabling the gate 140 to gate the 105 kHz pulse train from the frequency divide circuit 216. The counter 146 thereafter counts down to zero so as to actuate the quench latch 144 to provide the trailing edge of the flash fire signal which operates to quench the flash 150. As previously discussed, the change in the output signal from the quench latch 144 to a low (binary logic 0) signal level directed to one input terminal of the NOR gate 238 causes the NOR gate 238 to provide a high (binary logic 1) output signal level which is subsequently inverted by the inverter gate 240 and directed to one input terminal of the AND gate 148 so as to switch the output signal from the AND gate 148 to a low (binary logic 0) output signal level which defines the trailing edge of the flash fire control signal. As is readily apparent, the countdown period for the counter 146 corresponds directly to the number of counts previously counted up during the previous pre-exposure flash fire control ambient scene light measurement and thus operates to vary the duration of the flash fire control signal in inverse correspondence with the intensity of the ambient scene light detected prior to the exposure in the manner as is fully described in U.S. patent application Ser. No. 113,042, supra.

Referring now to FIG. 7, there is shown graphically the progressive decrease in the contribution to the film exposure from the artificial flash light as the ambient scene light intensity increases from 2 c/ft.$^2$ to 8 c/ft.$^2$. As is readily apparent for conditions of low ambient scene light intensity of less than 2 c/ft.$^2$, the strobe contribution to the film exposure is substantially 100 percent, while under conditions of ambient scene light intensity greater than 8 c/ft.$^2$ the strobe contribution to exposure remains substantially constant at 25 percent. In addition, there is also shown graphically the progressive increase in the contribution to film exposure for the ambient scene light as the ambient scene light increases from 2 c/ft.$^2$ to 8 c/ft.$^2$. Under conditions of ambient scene light intensity greater than 8 c/ft.$^2$, the contribution to the film exposure for ambient scene light remains substantially constant at 75 percent. Under conditions of high ambient scene light intensity greater than or equal to 8 c/ft.$^2$, there is provided a proportional fill flash photographic exposure wherein a select percentage such as 75 percent of the exposure is directly attributable to ambient light and the remaining percentage (25 percent) is directly attributable to artificial light. In addition, the amount of artificial light is considerably reduced in comparison to the amount of artificial light provided by the previously discussed low ambient scene light condition. For example, the difference in the amount of artificial flash light provided under conditions of high and low ambient scene light intensity may be in the order of 1½ stops as fully discussed in U.S. patent application Ser. No. 113,042, supra. In order to maintain the 25 percent contribution to exposure from the artificial light over a broad range of varying levels of ambient scene light intensity and camera-to-subject distance, it becomes necessary to increase the amount of light provided by the flash 150 as a function of both increasing camera-to-subject distance and increasing ambient scene light intensity. It is toward this end that the full range proportional fill flash circuit 194 of this invention is directed to operate in the manner to be now described.

Under the aforementioned condition of high ambient scene light intensity, the photographer commences a photographic exposure cycle in the same manner by depressing the photographic actuator button 170 so as to close switch S$_1$ and provide the various preset and reset signals in the manner as previously described. The preset signals operate first to signal the sonic rangefinder 180 to implement the sonic ranging function in the aforementioned manner during which times the counters 228 and 230 count up the 4.2 kHz pulse train. The rangefinder 180 provides the appropriate signals to terminate the 4.2 kHz pulse train input to the counters 228 and 230 in synchronism with receipt of the echo signal so that the counters 228 and 230 store a count which is directly proportional to the camera-to-subject range.

The aforementioned pre-exposure flash fire control ambient scene light measurement occurs next upon resetting the 10 millisecond time delay circuit 132 which, in turn, operates to inhibit the solenoid control circuit 154 from energizing the solenoid 62 for 10 milliseconds. The time delay circuit 132 also gates the OR gate 164 to open the switch 123 and thereby commence scene light integration by the integrator circuit 50. Under conditions of high ambient scene light intensity, the scene light integration output signal will progress so rapidly as to trip the level detector 124 either at or before the expiration of 3 milliseconds as best shown in FIG. 5. Whereas, the 3 millisecond time delay circuit 130 operates to inhibit the gating of the 2.1 kHz pulse train from the frequency divide circuit 136 into the counter 146, no clock pulses can be counted up beyond the preset number of eight clock pulses. Thus, the pre-exposure flash fire control ambient scene light measurement under conditions of high ambient scene light intensity equal to or greater than 8 c/ft.$^2$ results in the minimal eight pulse count input to the up/down counter 146.

During the pre-exposure flash fire control ambient scene light measurement, the counters 228 and 230 count down the 105 kHz pulse train from the frequency divide circuit 216. At the commencement of the pre-exposure flash fire control ambient scene light measurement, the preset signals to the full range proportional fill flash circuit 192 change states so as to enable the NAND gate 222 to gate through the 105 kHz pulse train to the counters 228 and 230 in the manner as previously described. The subsequent triggering of the level detector 124 as a result of the rapid scene light integration operates to switch the output signal from the latch 126 to a low (binary logic 0) output signal level which is directed to one input terminal of the NAND gate 222 thereby disabling the NAND gate 222 from further gating through the 105 kHz pulse train from the frequency divide circuit 216. In this manner, the counters 228 and 230 initially count up a 4.2 kHz clock pulse during the time between which the sonar ranging signal is transmitted and an echo from the subject is received so as to store a clock pulse count representative of the actual camera-to-subject range. The counters 228 and 230 thereafter count down a 105 kHz pulse train during the time of the pre-exposure flash fire control ambient scene light measurement wherein the number of pulses counted down decreases in corresponding relationship with an increase in the ambient scene light intensity. Thus, the resultant count stored by the counters 228 and 230 corresponds to both the camera-to-subject range and the ambient scene light intensity and an increase in either or both the camera-to-subject range and the ambient scene light intensity results in an increase in the resultant count stored by the counters 228 and 230.

The photographic exposure interval commences subsequent to the shutter blade elements moving to the scene light blocking arrangement of FIG. 1 in the aforementioned manner. The shutter blade elements 34 and 36 are thereafter released upon deenergization of the solenoid 62 to move under the urging of the influence of the drive spring 72 from the scene light blocking arrangement as shown in FIG. 1 toward the maximum aperture defining position as shown in FIG. 2 so as to define the continuous ever-increasing progression of effective apertures over the optical center axis 24. Under the aforementioned conditions of high ambient scene light intensity, the photocell sweep secondary apertures 42 and 44 define a continuous progression of ever-increasing apertures over the photoresponsive element 48 which provides an appropriate voltage response corresponding to the scene light intensity thereon which voltage response is thereafter integrated by the operational amplifier 114 and feedback capacitor 116 to provide an output signal representative of the time integration of the scene light intensity incident to the photoresponsive element 48. The output signal level at line 122 from the light integrating circuit 50 increases until reaching the trigger level for detector 152 so as to trigger the level detector 152 into an abrupt change of state at its output line from a generally low (binary logic 0) output signal level to a high (binary logic 1) output signal level sufficient to actuate a solenoid control circuit 154 to energize the solenoid 62 winding to retract the plunger 64. The walking beam 52 is thereby rotated in a counterclockwise direction as viewed from FIGS. 1 and 2 against the biasing force of spring 72 so as to move the shutter blade elements 34 and 36 into the light blocking position as shown in FIG. 1.

As previously discussed, upon commencement of the aforementioned photographic cycle, the LED/photocell sensor arrangement 80 provides a low (binary logic 0) output signal level since the walking beam flange 88 operates to block the light from the LED 84 from reaching the photoresponsive element 86. The output from the latch 158 is also at a correspondingly low voltage signal level (binary logic 0) and this low output level is provided to the inverter 160. Thus, the opening blade rotation of the walking beam slit 90 between the LED 84 and the photoresponsive element 86 operates to enable the AND gate 156 while simultaneously triggering the latch 158 to provide an output of high voltage level corresponding to a binary logic 1 signal level for the remainder of the exposure interval. Thus, in this manner, the opening movement of the shutter blade elements is prohibited from actuating the flash latch 142 and thereby, in turn, firing the flash.

In addition, it will be appreciated that the high (binary logic 1) output signal level from the latch 158 is also directed to one input terminal of the NOR gate 236 thereby assuring that the output from the NOR gate 236 remains in a low (binary logic 0) output signal level also for the remainder of the duration of the exposure cycle. The low (binary logic 0) output signal level from the NOR gate 236 is directed to one input terminal of the NOR gate 238 thereby enabling the NOR gate 238 to switch in response to the output signal level from the quench latch 144 switching from a high (binary logic 1) output signal level to a low (binary logic 0) output signal level. Thus, under conditions where the ambient scene light intensity is high but not sufficiently high to effect the closing movement of the blades prior to the walking beam slit 90 being rotated between the LED 84 and the photoresponsive element 86, the full range proportional fill flash circuit 192 of this invention is inhibited from influencing the flash fire control signal and a flash quench will be provided solely as a function of the switching of the quench latch 144.

Upon the closing movement of the shutter blade elements 34 and 36, the walking beam flange slit 90 is again moved between the LED 84 and the photoresponsive element 86 so as to provide another high (binary logic 1) output signal level to one input terminal of the AND gate 156. The other input terminal to the AND gate 156 is already enabled by the high (binary logic 1) output signal level from the level detector 152 and therefore switches to provide a high (binary logic 1) signal level to actuate the flash latch 142. Thus, only the ambient scene light is integrated during the opening movement of the shutter blade elements 34 and 36 and the strobe is subsequently fired during the closing movement of the shutter blade elements at the effective aperture appropriate for the range of subject to be photographed. Since the ambient scene light is only integrated to a level corresponding to some proportion of the optimum film exposure value preferably (75 percent) with the strobe providing the remaining proportion of the light required for a full film exposure, there is provided a proportional fill flash wherein the proportions of the exposure value directly attributable to the ambient scene light and the artificial scene light provided by the flash remains substantially constant under conditions of varying ambient scene light intensity and subject range.

Actuation of the flash latch 142, in turn, causes the counter 146 to count down in the aforementioned manner at the 105 kHz pulse train rate from the frequency divide circuit 216. Since the counter had previously only stored eight counts during the aforementioned pre-exposure flash fire control ambient scene light measurement, it is readily apparent that the zero count will be reached in substantially less time than for the previously described low ambient scene light intensity condition. Upon reaching the zero count, the output from the counter actuates the quench latch circuit 144 to provide a low (binary logic 0) output signal level to one input terminal of the NOR gate 238 thereby switching the NOR gate 238 to provide a high (binary logic 1) output signal level which is subsequently inverted by the inverter gate 240 and directed to one input terminal of the AND gate 148 to switch the output from the AND gate 148 to a low (binary logic 0) output signal level thereby terminating the flash fire control signal to the flash 150.

As previously discussed, it will be readily apparent that the switching of the output signal from the flash latch 142 to a low (binary logic 0) output signal level which is inverted by the inverter gate 218 and directed to one input terminal of the NOR gate 214 so as to enable the NOR gate 214 to gate through the 105 kHz clock pulse to the counters 228 and 230 ultimately has no effect upon quenching the strobe since the NOR gate 236 is disabled from switching as a result of the high (binary logic 1) output signal level received from the latch 158 when the opening blade movement operates to move the slit 90 between the LED 84 and photoresponsive element 86.

Referring now to the graph of FIG. 7, there is shown a percentage contribution of the film exposure attributable to ambient scene light and artificial flash light under the aforementioned conditions where the ambient scene light intensity is either equal to or greater than 8 c/ft.$^2$. The artificial light is shown graphically as providing a contribution of 25 percent to the 75 percent contribution of the ambient scene light. The artificial flash light for the high ambient scene light conditions is preferably 140 BCPS which is 1½ stops down from the high flash output 400 BCPS provided under the low ambient scene light conditions as evidenced from the graph of FIG. 6.

Under conditions of the aforementioned high ambient scene light intensity, it is possible that the level detector 152 will be triggered to actuate the control circuit 154 to energize the solenoid 62 winding prior to the walking beam 52 rotating a sufficient degree for the slit 90 to pass between the LED 84 and photoresponsive element 86. It is under these conditions that the full range proportional fill flash circuit 192 of this invention operates to increase the output from the strobe to maintain the aforementioned 25 percent to 75 percent contribution to exposure from the artificial and ambient scene light for reasons which will become apparent from the following discussion. Under these conditions, the latch 158 will not be triggered prior to the energization of the solenoid 62 winding and will therefore provide a high (binary logic 1) output signal level by way of the inverter 160 to one input terminal of the AND gate 162. In addition, the low (binary logic 0) output signal level from the latch 158 will be directed to one input terminal of the NOR gate 236 so as to enable the NOR gate 236 to subsequently switch in the manner of this invention to provide a flash quench signal.

Triggering of the level detector 152, in turn, will provide another (binary logic 1) input signal level to the other input terminal of the AND gate 162 so as to switch the output from the AND gate 162 to a high (binary logic 1) signal level thereby actuating the flash latch 142 by way of the OR gate 157. The high (binary logic 1) output signal level from the flash latch 142 is thereafter directed to one input terminal of the AND gate 148, the other input terminal to which is already at a high (binary logic 1) input signal level for reasons previously discussed so as to switch to a high (binary logic 1) output signal level thereby defining the appropriate leading edge to the flash fire signal to the flash 150 in general synchronism with deenergization of the solenoid 62 winding.

As is readily apparent, the flash 150 will not be fired at the effective aperture appropriate for the range of the subject to be photographed but at some smaller aperture which is nevertheless the maximum effective aperture possible which approximates the appropriate aperture for the subject range. However, in order to maintain the aforementioned 25 percent, 75 percent contribution to exposure from artificial and ambient scene light, respectively, it becomes necessary to increase the amount of light provided by the strobe. It is toward this end that the full range proportional fill flash circuit 192 of this invention becomes effective.

The high (binary logic 1) output signal level upon the switching of the flash latch circuit 142 is subsequently inverted by the inverter gate 218 to enable the NOR gate 214 to gate through the 105 kHz pulse train to the counters 228 and 230 by way of the NOR gate 212 and inverter 226. Thus, the counters 228 and 230 are enabled to start counting down at the same instant that the counter 146 counts down. In the event that the counter 146 should empty and reach a zero count prior to the counters 228 and 230 emptying there will be provided an output signal to the quench latch 144 so as to actuate the quench latch circuit 144 to switch and provide a low (binary logic 0) output signal level to one input terminal of the NOR gate 238. However, prior to the counters 228 and 230 counting down to a zero count the output signal level from the NOR gate 234 remains at a low (binary logic 0) output signal level which together with the low (binary logic 0) output signal level from the latch 158 maintains the output signal from the NOR gate 236 at a high (binary logic 1) signal level which is directed to one input terminal to NOR gate 238. Upon the counters 228 and 230 counting down to zero there are provided low (binary logic 0) signal levels to respective input terminals of the NOR gate 234 so as to switch the output therefrom to a high (binary logic 1) signal level which is thereafter directed to one input terminal of the NOR gate 236 so as to switch the output therefrom to a low (binary logic 0) signal level directed to one input terminal of the NOR gate 238. With both input signal levels to the NOR gate 238 being at low (binary logic 0) input signal levels, the NOR gate 238 switches to provide a high (binary logic 1) output signal level which is thereafter inverted by the gate 240 to provide the trailing edge of the flash fire control signal which operates to quench the flash 150.

Thus, under conditions of high ambient scene light intensity where the shutter blades are closed prior to reaching the appropriate aperture corresponding to the camera-to-subject range, the full range proportional fill flash circuit 192 of this invention operates to extend the duration of the flash fire time to progressively increase the amount of artificial light to maintain the aforementioned fill flash contribution to the film exposure of 25 percent artificial light. The effect of the full range proportional fill flash circuit 192 in increasing the amount of artificial light from the strobe may be best understood by now referring to the graphs of FIGS. 6 and 8 where the increase in the amount of artificial light provided by the strobe is plotted as a function of both increasing ambient scene light intensity and increasing camera-to-subject range. Thus, it can be seen that the full range proportional fill flash circuit 192 operates to increase the amount of light provided by the strobe 150 from 140 BCPS under conditions of ambient scene light intensity less than 25 c/ft.$^2$ and camera-to-subject distances of less than 12 feet or, alternatively, ambient scene light intensities of less than 12.5 c/ft.$^2$ and camera-to-subject distances of less than 18 feet to 650 BCPS under conditions where the ambient scene light intensity is greater than 800 c/ft.$^2$ and the camera-to-subject distances are greater than 18 feet. Thus, there is provided a means for maintaining a select ratio between the artificial and ambient scene light contribution to the exposure over a substantially greater range of camera-to-subject distances in ambient scene light intensitites than was heretofore possible.

However, since the full range proportional fill flash circuit 192 of this invention has been described in the context of a single lens reflex camera, it is readily apparent that such a system could also be utilized in cameras of the non-reflex type. Thus, other embodiments of the invention, including additions, subtractions and other modifications of the preferred disclosed embodiments of the invention will be obvious to those skilled in the art and are within the scope of the following claims.

What is claimed is:

1. In a photographic exposure control system of the type for controlling both the duration of a photographic exposure interval and the amount of artificial illumination provided during the exposure interval to provide a proportional fill flash exposure, the improvement comprising:

means for further controlling the amount of artificial illumination provided during the exposure interval in a manner whereby the amount of artificial illumination provided during the exposure interval is increased in direct corresponding relation with increases in the camera-to-subject distance and the ambient scene light intensity in order to maintain the same proportional contribution to the film exposure from the ambient and artificial light during a fill flash exposure.

2. The improvement of claim 1 wherein the exposure control system is of the type which includes means for determining the camera-to-subject distance prior to the exposure interval and for providing a timed signal corresponding to the determined camera-to-subject distance and means for detecting the ambient scene light intensity prior to the exposure interval and wherein said means for further controlling the amount of artificial illumination comprises means for counting the pulses for a first select frequency pulse train during a time interval corresponding to the timed signal provided by the camera-to-subject distance determining means prior to exposure, and for counting pulses from a second select frequency pulse train to offset against said pulses already counted from said first pulse train during a subsequent time interval corresponding to the time during which the pre-exposure ambient scene light is detected, said resultant pulse count thereafter being utilized during the exposure interval to time the duration of the artificial illumination during the fill flash exposure.

3. The improvement of claim 2 wherein the frequency of said first and second pulse trains are selected with respect to each other so as to assure that said resultant pulse count from said counting means is zero when the ambient scene light detected prior to the exposure interval is less than a select level thereby also assuring that said means for further controlling the amount of artificial illumination operates to control the amount of artificial illumination only under conditions where the ambient scene light intensity is above said select level.

4. The improvement of claim 3 wherein the exposure control system includes a shutter blade mechanism, means for mounting the shutter blade mechanism for displacement between at least one arrangement wherein it blocks scene light from reaching a focal plane and another arrangement wherein it defines a maximum size aperture so that the blade mechanism defines a range of progressively increasing sized apertures for admitting scene light to the focal plane as it moves from its scene light blocking arrangement to its maximum aperture size defining arrangement, means for detecting the scene light during the exposure interval in correspondence with the scene light admitted to the focal plane by the blade mechanism and for providing an assertive output signal upon the detection of a select amount of scene light corresponding to a select exposure value, selectively actuatable drive means for driving the shutter blade mechanism from its scene light blocking arrangement to its scene light unblocking arrangement and for thereafter returning the shutter blade mechanism to its scene light blocking arrangement in response to the assertive output signal from the scene light detecting means, and means for providing a signal to ignite the source of artificial illumination at the aperture defined by the blade mechanism when the aperture size corresponds to the camera-to-subject distance or, alternatively, at the aperture size defined by the blade mechanism upon receipt of the assertive output signal from the scene light detecting means when such aperture size is less than the aperture size corresponding to the camera-to-subject distance; and wherein said means for further controlling the amount of artificial illumination includes gating means for disabling the artificial illumination control influence provided by said means for further controlling the amount of artificial illumination when the source of artificial illumination is ignited at the aperture size corresponding to the camera-to-subject distance.

5. The improvement of claim 2 wherein said counting means is signalled in correspondence with the ignition of the source of artificial illumination to start counting back to zero from said resultant pulse count and wherein the time required for said counting means to count back from said resultant pulse count to zero determines the duration at which the source of artificial illumination is ignited.

6. The improvement of claim 5 wherein the source of artificial illumination is an electronic flash of the quench type and wherein said means for further controlling the amount of artificial illumination includes gating means responsive to said counting means counting back from said resultant pulse count to zero to provide a signal effective to quench the electronic flash.

7. A system for controlling the amount of light provided by a source of artificial illumination during an exposure interval for use with a photographic camera apparatus of the type having a photographic exposure control system for controlling the admission of scene light to a focal plane to define an exposure interval wherein the exposure control system also includes means responsive to the determination of camera-to-subject distance for providing an output response corresponding to the determined camera-to-subject distance and means for detecting the ambient scene light intensity and for providing a response to the ambient scene light so detected, said control system comprising:

means for providing at least one pulse train output signal;

means for counting the individual pulses from said pulse train; and gating means for gating said pulse train output signal to said counting means to enable said counting means to count the individual pulses therefrom during an interval corresponding to the determined camera-to-subject distance so as to input said counting means with a pulse count corresponding to the camera-to-subject distance, said gating means thereafter gating said pulse train output signal to said counting means to enable said counting means to offset the individual pulses counted therefrom against the previous pulse count during the interval in which the ambient scene light is detected prior to the exposure interval so as to input said counting means with a resultant pulse count corresponding to both the camera-to-subject distance and the ambient scene light intensity, said gating means thereafter responding to the ignition of the source of artificial illumination to gate said pulse train output signal to said counting means to enable said counting means to again offset the individual pulses counted therefrom against said previous resultant pulse count until reaching a zero count at which instant said gating means responds to provide a signal terminating the ignition of the source of artificial illumination.

8. The control system of claim 7 wherein the source of artificial illumination is an electronic flash of the quench type and wherein said terminating signal quenches the electronic flash.

9. A system for controlling the amount of light provided by a source of artificial illumination during an exposure interval for use with a photographic camera apparatus of the type having a photographic exposure control system for controlling the admission of scene light to a focal plane to define an exposure interval wherein the exposure control system also includes means responsive to the determination of camera-to-subject distance prior to the exposure interval for providing a timed signal corresponding to the determined camera-to-subject distance and means for detecting the ambient scene light intensity prior to the exposure interval, said control system comprising:
   means for providing first and second pulse train output signals;
   means for counting the individual pulses from said first and second pulse trains; and
   gating means for gating said first pulse train to said counting means to enable said counting means to count the individual pulses therefrom during the interval of the timed signal thereby inputting said counting means with a pulse count corresponding to the camera-to-subject distance, said gating means thereafter gating said second pulse train to said counting means to enable said counting means to offset the individual pulses counted therefrom against the previous pulse count from said first pulse train during the interval in which the ambient scene light is detected prior to the exposure interval thereby inputting said counting means with a resultant pulse count corresponding to both the camera-to-subject distance and the ambient scene light intensity, said gating means thereafter responding to the ignition of the source of artificial illumination to gate said second pulse train to said counting means to enable said counting means to again offset the individual pulses counted therefrom against said previous resultant pulse count until reaching a zero count at which instant said gating means responds to provide a signal for terminating the ignition of the source of artificial illumination.

10. The system of claim 9 wherein the frequency of said first and second pulse trains are selected with respect to each other so as to assure that said resultant pulse count from said counting means is zero when the ambient scene light detected prior to the exposure interval is less than a select level thereby also assuring that said artificial illumination control system operates to control the amount of artificial illumination only under conditions where the ambient scene light intensity is above said select level.

11. The system of claim 9 wherein the camera photographic control system further includes a shutter blade mechanism, means for mounting the shutter blade mechanism for displacement between at least one arrangement wherein it blocks scene light from reaching a focal plane and another arrangement wherein it defines a maximum size aperture wherein the blade mechanism defines a range of progressively increasing sized apertures for admitting scene light to the focal plane as it moves from its scene light blocking arrangement to its maximum aperture size defining arrangement, means for detecting the scene light during the exposure interval in correspondence with the scene light admitted to the focal plane by the blade mechanism and for providing an assertive output signal upon the detection of a select amount of scene light corresponding to a select exposure value, selectively actuatable drive means for driving the shutter blade mechanism from its scene light blocking arrangement to its scene light unblocking arrangement and for thereafter returning the shutter blade mechanism to its scene blocking arrangement in response to the assertive output signal from the scene light detecting means, and means for providing a signal to ignite the source of artificial illumination at the aperture defined by the blade mechanism when the aperture size corresponds to the camera-to-subject distance or, alternatively, at the aperture size defined by the blade mechanism upon receipt of the assertive output signal from the scene light detecting means when such aperture size is less than the aperture size corresponding to the camera-to-subject distance; and wherein said gating means responds to provide said ignition terminating signal only in response to the signal to ignite the source of artificial illumination being provided at the aperture size defined by the blade mechanism upon receipt of the assertive output signal from the scene light detecting means when such aperture size is less than the aperture size corresponding to the camera-to-subject distance.

12. The system of claim 11 wherein the source of artificial illumination is an electronic flash of the quench type and wherein said artificial illumination control system gating means responds to said counting means counting back from said resultant pulse count to zero to provide said ignition terminating signal to quench the electronic flash.

13. A photographic camera apparatus for use with a source of artificial illumination comprising:
   means responsive to the determination of the camera-to-subject distance for providing an output response corresponding to the determined camera-to-subject distance;
   a shutter blade mechanism;
   means for mounting the shutter blade mechanism for displacement between at least one arrangement wherein it blocks scene light from reaching a focal plane and another arrangement wherein it defines a maximum size aperture, said blade mechanism defining a range of progressively increasing sized apertures for admitting scene light to the focal plane as it moves from its scene light blocking arrangement to its maximum aperture defining arrangement;
   means for detecting the ambient scene light intensity prior to an exposure interval and for providing an output signal in response to the ambient scene light so detected, said detecting means also operating to detect scene light during an exposure interval in correspondence with the scene light admitted by said blade mechanism to provide an assertive output signal upon the detection of a select amount of scene light corresponding to a select exposure value;
   selectively actuatable drive means for driving said shutter blade mechanism from its scene light blocking arrangement to its scene light unblocking arrangement and for thereafter returning said shutter blade mechanism to its scene light blocking arrangement to terminate the exposure interval in response to the assertive output signal from said scene light detecting means;

means for providing a signal for igniting the source of artificial illumination at the aperture defined by the blade mechanism when the aperture size corresponds to the camera-to-subject distance or, alternatively, at the aperture size defined by the blade mechanism upon receipt of said assertive output signal from said scene light detecting means when such aperture size is less than the aperture size corresponding to the camera-to-subject distance; and artificial illumination control means for controlling the amount of artificial illumination as a function solely of said output signal from said ambient scene light detecting means prior to the exposure interval when the source of artificial illumination is ignited at the aperture size corresponding to the camera-to-subject distance or, alternatively, for controlling the amount of artificial illumination as a function of both said output response which corresponds to said determined camera-to-subject distance and said output signal from said ambient scene light detecting means prior to the exposure interval when the source of artificial illumination is ignited at the aperture size defined by said blade mechanism upon receipt of said assertive output signal from said scene light detecting means.

14. The camera of claim 13 wherein said artificial illumination control means operates to increase the amount of artificial illumination provided during the exposure interval in correspondence with decreasing ambient scene light intensity when the source of artificial illumination is ignited at the aperture size corresponding to the camera-to-subject distance and to increase the amount of artificial illumination provided during the exposure interval in correspondence with increasing ambient scene light intensity and increasing camera-to-subject distance when the source of artificial illumination is ignited at the aperture size defined by said blade mechanism upon receipt of said assertive output signal from said scene light detecting means.

15. The camera of claim 14 wherein said artificial illumination control means comprises:

means for providing at least one pulse train output signal;

means for counting the individual pulses from said pulse train; and gating means for gating said pulse train output signal to said counting means to enable said counting means to count the individual pulses therefrom during an interval corresponding to the determined camera-to-subject distance so as to input said counting means with a pulse count corresponding to the camera-to-subject distance, said gating means thereafter gating said pulse train output signal to said counting means to enable said counting means to offset the individual pulses counted therefrom against the previous pulse count during the interval in which the ambient scene light is detected prior to the exposure interval so as to input said counting means with a resultant pulse count corresponding to both the camera-to-subject distance and the ambient scene light intensity, said gating means thereafter responding to the ignition of the source of artificial illumination to gate said pulse train output signal to said counting means to enable said counting means to again offset the individual pulses counted therefrom against said previous resultant pulse count until reaching a zero count at which instant said gating means responds to provide a signal terminating the ignition of the source of artificial illumination.

16. The camera of claim 15 wherein said resultant pulse count from said counting means is zero when the ambient scene light detected prior to the exposure interval is less than a select level thereby disabling said artificial illumination control system from increasing the amount of artificial illumination in correspondence with increasing camera-to-subject distance.

17. The camera of claim 16 wherein the source of artificial illumination is an electronic flash of the quench type and wherein said artificial illumination control system gating means responds to said counting means counting back from said resultant pulse count to zero to provide said ignition terminating signal to quench the electronic flash.

18. A photographic camera apparatus of the type having an exposure control system for controlling the admission of scene light to a focal plane to define an exposure interval and for use with a source of artificial illumination, said apparatus comprising:

means responsive to the determination of the camera-to-subject distance for providing an output response corresponding to the determined camera-to-subject distance;

means for detecting the ambient scene light intensity at least prior to an exposure interval and for providing an output signal in response to the ambient scene light so detected; and artificial illumination control means for controlling the amount of artificial illumination as a function solely of said output signal from said ambient scene light detecting means prior to the exposure interval when the said output signal from said ambient scene light detecting means prior to the exposure interval is less than a select value or, alternatively, for controlling the amount of artificial illumination as a function of both said output response which corresponds to said determined camera-to-subject distance and said output signal from said ambient scene light detecting means prior to the exposure interval when said output signal from said ambient scene light detecting means prior to the exposure interval is greater than said select value.

19. The camera of claim 18 wherein said artificial illumination control means operates to increase the amount of artificial illumination provided during the exposure interval in correspondence with decreasing ambient scene light intensity when said ambient scene light intensity detected prior to exposure is less than said select value and to increase the amount of artificial illumination provided during the exposure interval in correspondence with increasing ambient scene light intensity and increasing camera-to-subject distance when said ambient scene light intensity detected prior to exposure is greater than said select value.

20. The camera of claim 19 wherein the source of artificial illumination is an electronic flash of the quench type and wherein said artificial illumination control means responds to provide a signal to quench the electronic flash.

* * * * *